(12) United States Patent
Shigeoka et al.

(10) Patent No.: US 8,132,967 B2
(45) Date of Patent: Mar. 13, 2012

(54) WHEEL BEARING APPARATUS INCORPORATED WITH A WHEEL SPEED DETECTING APPARATUS

(75) Inventors: Kazuhisa Shigeoka, Iwata (JP); Syougo Suzuki, Iwata (JP); Yujiro Ono, Iwata (JP); Kazuo Komori, Iwata (JP); Kikuo Fukada, Iwata (JP)

(73) Assignee: NTN Corporation (JP)

( * ) Notice: Subject to any disclaimer, the term of this patent is extended or adjusted under 35 U.S.C. 154(b) by 575 days.

(21) Appl. No.: 11/662,419

(22) PCT Filed: Sep. 9, 2005

(86) PCT No.: PCT/JP2005/016612
§ 371 (c)(1),
(2), (4) Date: Apr. 19, 2007

(87) PCT Pub. No.: WO2006/028209
PCT Pub. Date: Mar. 16, 2006

(65) Prior Publication Data
US 2007/0253653 A1 Nov. 1, 2007

(30) Foreign Application Priority Data

| Sep. 10, 2004 | (JP) | ................... | 2004-264194 |
|---|---|---|---|
| Sep. 21, 2004 | (JP) | ................... | 2004-273180 |
| Oct. 6, 2004 | (JP) | ................... | 2004-294107 |
| Oct. 14, 2004 | (JP) | ................... | 2004-300362 |
| Oct. 14, 2004 | (JP) | ................... | 2004-300363 |
| Nov. 11, 2004 | (JP) | ................... | 2004-327307 |

(51) Int. Cl.
*F16C 41/04* (2006.01)
(52) U.S. Cl. .................................... 384/448
(58) Field of Classification Search .................. 384/448, 384/477, 478, 480, 484, 486, 488, 489; 277/571
See application file for complete search history.

(56) References Cited

U.S. PATENT DOCUMENTS
2,759,778 A * 8/1956 Anderson ..................... 384/480
(Continued)

FOREIGN PATENT DOCUMENTS
EP 1 342 633 9/2003
(Continued)

*Primary Examiner* — Thomas R Hannon
*Assistant Examiner* — Phillip A Johnson
(74) *Attorney, Agent, or Firm* — Harness, Dickey & Pierce, P.L.C.

(57) ABSTRACT

A wheel bearing apparatus with an incorporated wheel speed detecting apparatus has an outer member with double row outer raceway surfaces formed on its inner circumferential surface. An inner member includes a wheel hub with an integrally formed wheel mounting flange at one end. A cylindrical portion axially extends from the wheel mounting flange. An inner ring is fit onto the cylindrical portion of the wheel hub. Double row inner raceway surfaces, opposite to the double row outer raceway surfaces, are formed on the outer circumferential surfaces of the wheel hub and inner ring, respectively. Double row rolling elements are arranged between the outer and inner raceway surfaces. An encoder is mounted on the outer circumferential surface of the inner ring. An annular sensor holder is arranged on the end of the outer member opposite to the encoder. A wheel rotation speed detecting sensor is integrally molded with the sensor holder and arranged opposite to the encoder, via a predetermined radial gap. The encoder has an annular ring configuration with its characteristics alternately and equidistantly varying along its circumferential direction. A seal is arranged at the inboard side of the encoder via the sensor holder. The seal includes a first annular sealing plate and a second annular sealing plate. The first and second annular plates are mounted on the sensor holder and the inner ring, respectively, and opposite toward each other.

15 Claims, 11 Drawing Sheets

U.S. PATENT DOCUMENTS

| | | | |
|---|---|---|---|
| 4,968,156 A | | 11/1990 | Hajzler |
| 5,085,519 A | | 2/1992 | Dougherty |
| 5,388,916 A | | 2/1995 | Ohtsuki et al. |
| 5,564,839 A | | 10/1996 | Ouchi et al. |
| 5,663,640 A | * | 9/1997 | Sakamoto .................... 324/173 |
| 5,969,518 A | | 10/1999 | Merklein et al. |
| 2002/0130655 A1 | | 9/2002 | Okada et al. |
| 2003/0110860 A1 | | 6/2003 | Okada |
| 2003/0202723 A1 | | 10/2003 | Tajima et al. |
| 2004/0105602 A1 | * | 6/2004 | Mizutani et al. ............. 384/448 |
| 2004/0136628 A1 | * | 7/2004 | Inoue .......................... 384/448 |

FOREIGN PATENT DOCUMENTS

| | | | |
|---|---|---|---|
| EP | 1 705 089 | | 9/2006 |
| JP | 4-50724 | | 4/1992 |
| JP | 50724/1992 | | 4/1992 |
| JP | 4-133801 A | | 5/1992 |
| JP | 4-74729 | | 6/1992 |
| JP | 55070/1993 | | 7/1993 |
| JP | 6-109027 A | | 4/1994 |
| JP | 40446/1994 | | 5/1994 |
| JP | 08-043411 | | 2/1996 |
| JP | 10-160744 A | | 6/1998 |
| JP | 2000-225931 | | 8/2000 |
| JP | 2002-372548 A | | 12/2002 |
| JP | 2002372548 A | * | 12/2002 |
| JP | 2003-161324 | | 6/2003 |
| JP | 2003-187368 A | | 7/2003 |
| JP | 2003-254985 A | | 9/2003 |
| JP | 2003-262647 | | 9/2003 |
| JP | 2004-205008 | | 7/2004 |
| JP | 2005-300289 | | 10/2005 |

* cited by examiner (a)

(b)

PRIOR ART

WHEEL BEARING APPARATUS INCORPORATED WITH A WHEEL SPEED DETECTING APPARATUS

CROSS-REFERENCE TO RELATED APPLICATIONS

This application is a National Stage of International Application No. PCT/JP2005/16612, filed Sep. 9, 2005, which claims priority to Japanese Patent Application No. 2004-264194, filed Sep. 10, 2004; Japanese Patent Application No. 2004-273180, filed on Sep. 21, 2004; Japanese Patent Application No. 2004-294107, filed on Oct. 6, 2004; Japanese Patent Application No. 2004-300362, filed on Oct. 14, 2004; Japanese Patent Application No. 2004-300363, filed on Oct. 14, 2004; and Japanese Patent Application No. 2004-327307, filed on Nov. 11, 2004. The disclosures of the above applications are incorporated herein by reference.

FIELD

The present disclosure relates to a vehicle wheel bearing apparatus and, more particularly, to a wheel bearing apparatus with an incorporated wheel speed detecting apparatus to detect rotation speed of wheel of vehicle.

BACKGROUND

It is generally known for a wheel bearing apparatus which supports a vehicle wheel relative to a suspension apparatus to incorporate a wheel speed detecting apparatus to detect a rotation speed of a vehicle wheel to detect the wheel speed to control the anti-lock braking system (ABS). Such a bearing apparatus generally includes a wheel speed detecting apparatus with a magnetic encoder. The magnetic encoder has magnetic poles alternately arranged along a circumferential direction integrated into a sealing apparatus, arranged between the inner and outer members, to contain rolling elements (balls or rollers). A wheel speed detecting sensor detects the variation in the magnetic poles of the magnetic encoder according to the rotation of the wheel.

The wheel speed sensor is usually mounted on a knuckle after the wheel bearing apparatus has been mounted on the knuckle to form a suspension apparatus. Recently, it has been proposed that a wheel bearing apparatus be incorporated with a wheel speed detecting apparatus where a wheel speed detecting sensor is self-contained within the wheel bearing. This reduces the size of the wheel bearing apparatus as well as eliminates troublesome air gap adjustment between the wheel speed sensor and the magnetic encoder.

An example of a prior art wheel bearing apparatus incorporated with a wheel speed detecting apparatus is known in Japanese Laid-open Patent Publication No. 2003/254985 as shown in FIG. 15. This wheel bearing apparatus incorporated with a wheel speed detecting apparatus includes an outer member 101, forming a stationary member secured on a suspension apparatus (not shown) and an inner member 102, defining a wheel hub 105 and an inner ring 106, inserted into the outer member 101 via double row rolling elements (balls) 103 and 103. The outer member 101 has an integrally formed wheel mounting flange at one end and double row outer raceway surfaces 101a and 101a formed on its inner circumferential surface. The inner member 102 is formed with double row inner raceway surfaces 105a and 106a opposite to the double row outer raceway surfaces 101a and 101a. One (105a) of these double row inner raceway surfaces is formed on the outer circumferential surface of the wheel hub 105. The other surface (106a) is formed on the outer circumferential surface of the inner ring 106. The inner ring 106 is press-fit onto the cylindrical portion 105b and extends axially from the inner raceway surface 105a of the wheel hub 105. Double row rolling elements 103 and 103 are arranged between the outer and inner raceway surfaces 101a and 101a; 105a and 106a, respectively, and are held in position by cages 107 and 107.

The wheel hub 105 has an integrally formed wheel mounting flange 104 to mount a wheel (not shown) and hub bolts 104a to secure the wheel. The hub bolts 104a are rigidly secured on the wheel mount flange 104 and are equidistantly positioned along its periphery. A serration 105c is formed on the inner circumferential surface of the wheel hub 105. A stem portion 111 of an outer joint member 110, forming a constant velocity universal joint (not shown), is inserted into the serration 105c. Seals 108 and 109 are arranged at both ends of the outer member 101 to prevent leakage of grease contained within the bearing as well as ingress of rain water or dusts.

The inboard side seal 109, as shown in an enlarged view of FIG. 16, is fit into the inner circumference at the end of the outer member 101. The seal 109 has a first sealing plate 112 and a second sealing plate 113 having a "L" shaped cross-section. The second sealing plate 113 has a cylindrical portion 113a fit onto the outer circumference of the inner ring 106. A standing portion 113b extends radially outward from the cylindrical portion 113a. A magnetic encoder 114 is adhered, via vulcanized adhesion, on the outer surface of the standing portion 113b. The magnetic encoder 114 is formed of a rubber magnet with N and S magnetic poles alternately arranged along the circumference direction.

The first sealing plate 112 includes a metal core 115 having a substantially "L" shaped cross-section. A sealing member 116, including a side lip 116a, is in sliding contact with the inner side surface of the standing portion 113b of the second sealing plate 113. A pair of radial lips 116b and 116c is in sliding contact with the cylindrical portion 113a of the second sealing plate 113.

An annular sensor holder 119 is mounted on one end of the outer member 101. The annular sensor holder 119 includes a fitting cylinder 117 and a holding member 118 connected to the fitting cylinder 117. The fitting cylinder 117 has an annular configuration with an "L" shaped cross-section. The fitting cylinder 117 includes a cylindrical portion 117a and a flange portion 117b which extends radially inward from the cylindrical portion 117a.

The holding member 118 is made by synthetic resin molding it to an annular body in which a wheel speed sensor 120 is embedded. The wheel speed sensor 120 is arranged opposite to the magnetic encoder 114, via a predetermined air gap therebetween. The wheel speed sensor 120 includes a magnetic detecting element such as a Hall element, a magnetic resistance element (MR element) etc. changing characteristics in accordance with the flowing direction of magnetic flux, and an IC incorporated with a waveform shaping circuit for shaping the output waveform of the magnetic detecting element.

A labyrinth seal is formed by a small gap 121 by arranging the flange portion 117b of the fitting cylinder 117 opposite to the end surface of the inner ring 106, via the small gap 121. This prevents ingress of foreign matter from outside of the bearing apparatus, such as magnetic powder, into a space between the magnetic encoder 114 and the detecting portion of the wheel speed sensor 120 even before the stem portion 111 of the outer joint member 110 is inserted into the wheel hub 105. The ingress is prevented even though it includes a course where the bearing apparatus is transferred to an assembly line of a manufacturer of automobiles. Accordingly, the reliability of detecting the rotation speed of wheel can be improved.

However, although the wheel bearing apparatus incorporated with a wheel speed detecting apparatus of the prior art has the effects mentioned above, it is impossible to prevent ingress of foreign matter from outside of the bearing apparatus, such as magnetic powder, into the space between the magnetic encoder 114 and the detecting portion of the wheel speed sensor 120 under severe circumstances in real running conditions of the vehicle.

SUMMARY

It is, therefore, an object of the present disclosure to provide a wheel bearing apparatus with an incorporated wheel speed detecting apparatus which is small in size and prevents ingress of foreign matter into the wheel speed detecting region and thus improves the durability as well as the reliability of the detecting apparatus.

It is an object to provide a wheel bearing apparatus with an incorporated wheel speed detecting apparatus which comprises an outer member with double row outer raceway surfaces formed on its inner circumferential surface. An inner member includes a wheel hub with an integrally formed wheel mounting flange at one end. A cylindrical portion axially extends from the wheel mounting flange. An inner ring is fit onto the cylindrical portion of the wheel hub. Double row inner raceway surfaces, opposite to the double row outer raceway surfaces, are formed on the outer circumferential surfaces of the wheel hub and inner ring, respectively. Double row rolling elements are arranged between the outer and inner raceway surfaces. An encoder is mounted on the outer circumferential surface of the inner ring. An annular sensor holder is arranged on the end of the outer member opposite to the encoder. A wheel rotation speed detecting sensor is integrally molded with the sensor holder and is arranged opposite to the encoder, via a predetermined radial gap. The encoder has an annular ring configuration and its characteristics alternately and equidistantly vary along its circumferential direction. A seal is arranged at the inboard side of the encoder, via the sensor holder. The seal includes a first annular sealing plate and a second annular sealing plate mounted on the sensor holder and the inner ring, respectively. The plates are positioned opposite toward each other.

The encoder has an annular ring configuration. Thus, its characteristics alternately and equidistantly vary along its circumferential direction. The seal is arranged at the inboard side of the encoder, via the sensor holder. The seal includes a first annular sealing plate and a second annular sealing plate which are mounted on the sensor holder and the inner ring, respectively, and opposite toward each other. The encoder is integrally arranged on the second sealing plate. Thus, it is possible to prevent the ingress of foreign matter from outside of the bearing apparatus, such as magnetic powder, into a space between the magnetic encoder and the detecting portion of the wheel speed sensor even before the stem portion of the outer joint member is inserted into the wheel hub. The ingress is prevented even though it includes a course where the bearing apparatus is transferred to an assembly line of a manufacturer of automobiles. Also, ingress is prevented under severe circumstances in real running conditions of the vehicle. Thus, it is possible to remarkably improve the reliability of detection of the wheel rotation speed.

The encoder is a magnetic encoder with N and S poles alternately arranged along its circumference. This makes it possible to detect the wheel rotation speed with high accuracy and low cost.

The sensor holder includes a steel sheet annular fitting member and a holding member. The fitting member includes a cylindrical fitting portion press-fit onto the outer circumferential surface of the outer member. A flange portion extends radially inward from the fitting portion and is adapted to be in close contact with the end surface of the outer member. A cylindrical portion extends axially from the flange portion. The first sealing plate is fit into the cylindrical portion. This makes it possible to reduce the radial dimension of the wheel bearing apparatus and to simplify the associated parts of wheel rotation speed detecting sensor. Thus, this further improves the workability of the assembly.

The annular fitting member is press-formed of non-magnetic steel plate and has corrosion resistance. This makes it possible to prevent the detecting performance of the wheel rotation speed detecting sensor from being exposed to harmful influences. This further improves the durability of the seal.

A smaller diameter portion is formed on the outer circumferential surface of the inner ring. The seal is mounted within an annular space formed between the smaller diameter portion and the sensor holder. This makes it possible to assure a sufficient height of the seal and thus to remarkably improve the sealing tightness.

The second sealing plate has a cylindrical portion and a standing portion which extends radially outward from the cylindrical portion. A sealing member is integrally adhered to the first sealing plate via vulcanized adhesion. Lips of the sealing member are in sliding contact with the cylindrical portion and the standing portion.

The second sealing plate has a cylindrical portion, a larger cylindrical portion and a standing portion which extends radially outward from the larger cylindrical portion. A sealing member is integrally adhered to the first sealing plate via vulcanized adhesion. Lips of the sealing member are in sliding contact with the larger cylindrical portion and the standing portion.

A ring shaped elastic member is elastically fit within an annular space between the larger cylindrical portion and the outer circumferential surface of the inner ring. This makes it possible to remarkably improve the tightness of the seal in the fitting portion between the larger cylindrical portion and the inner ring. Thus, this prevents ingress of rain water or dusts from the environment into the bearing over the long term.

The cylindrical portion is projected from a larger end face of the inner ring. This makes it possible to reduce the width of the inner ring to a minimum and thus to further reduce the weight and size of the bearing apparatus in order to improve the fuel consumption of the vehicle.

The encoder and the wheel rotation speed detecting sensor are arranged at a predetermined angle. The inclination of the encoder enables an increase in the volume of the magnet and thus an increase in the magnetic flux density of the magnetic encoder. This makes it possible to set a large air gap between the encoder and the sensor. Thus, this improves the freedom of design and simplifies the assembling workability.

A shield having a substantially "C" shaped cross-sectional configuration is arranged at the inboard side of the seal. The shield is opposite to a shoulder of the outer joint member via a small radial gap to form a labyrinth seal therebetween. The formation of the labyrinth seal, due to the provision of the "C" shaped shield, makes it possible to further improve the tightness of sealing during actual running of the vehicle.

The shield includes a first cylindrical portion fit into the sensor holder. A standing portion extends radially inward from the first cylindrical portion. A second cylindrical portion axially extends from the standing portion. The standing portion is opposite to the second sealing plate, via a small axial gap, to form a labyrinth seal therebetween.

The shield includes a first cylindrical portion fit into the sensor holder. A standing portion extends radially inward from the first cylindrical portion. A second cylindrical portion axially extends from the standing portion. The second cylindrical portion is opposite to the end face of the inner ring, via a small axial gap, to form a labyrinth seal therebetween.

A wheel bearing apparatus with an incorporated wheel speed detecting apparatus comprises an outer member with double row outer raceway surfaces formed on its inner circumferential surface. An inner member includes a wheel hub with an integrally formed wheel mounting flange at one end. A cylindrical portion axially extends from the wheel mounting flange. An inner ring is fit onto the cylindrical portion of the wheel hub. Double row inner raceway surfaces, opposite to the double row outer raceway surfaces, are formed on the outer circumferential surfaces of the wheel hub and inner ring, respectively. Double row rolling elements are arranged between the outer and inner raceway surfaces. An encoder is mounted on the outer circumferential surface of the inner ring. A sensor holder includes an annular fitting member. A holding member, with an embedded wheel rotation speed detecting sensor, is arranged opposite to the encoder via a predetermined radial gap. The encoder has an annular ring configuration with its characteristics alternately and equidistantly varying along its circumferential direction. The sensor holder is arranged radially inward from the outer circumferential surface of a knuckle fitting surface of the outer member. Terminals for taking out output signal from the wheel rotation speed detecting sensor extend radially outward and are connected to wire harnesses circumferentially arranged along the end surface of the outer member.

The encoder has an annular ring configuration with its characteristics alternately and equidistantly varying along its circumferential direction. The sensor holder is arranged radially inward from the outer circumferential surface of a knuckle fitting surface of the outer member. Terminals, for taking out output signal from the wheel rotation speed detecting sensor, extend radially outward and are connected to wire harnesses circumferentially arranged along the end surface of the outer member. Thus, it is possible to simplify the associated parts of the wheel rotation speed detecting sensor and to further improve the workability of assembly and to prevent the holding member and the wire harnesses from being projected radially outward and causing interference with the suspension apparatus of vehicle.

The wheel rotation speed detecting sensor is formed by a plurality of magnetic detecting elements. The wheel rotation speed detecting sensor and the leading-out portion for connecting the terminals and wire harnesses are integrally molded within the holding member by synthetic resin. This makes it possible to prevent damage and fall-out of the holding member which would be caused by flying gravel during running of the vehicle as well as the generation of corrosion of the terminals and the leading-out portion of the wire harnesses. Thus, this improves the reliability of the bearing apparatus.

A wheel bearing apparatus with an incorporated wheel speed detecting apparatus comprises an outer member with double row outer raceway surfaces formed on its inner circumferential surface. An inner member includes a wheel hub with an integrally formed wheel mounting flange at one end. A cylindrical portion axially extends from the wheel mounting flange. An inner ring is fit onto the cylindrical portion of the wheel hub. Double row inner raceway surfaces, opposite to the double row outer raceway surfaces, are formed on the outer circumferential surfaces of the wheel hub and inner ring, respectively. Double row rolling elements are arranged between the outer and inner raceway surfaces. An encoder is mounted on the outer circumferential surface of the inner ring. An annular sensor holder is arranged on the end of the outer member opposite to the encoder. A wheel rotation speed detecting sensor is integrally molded with the sensor holder and arranged opposite to the encoder, via a predetermined radial gap. The encoder has an annular ring configuration with its characteristics alternately and equidistantly varying along its circumferential direction. A seal is arranged at the inboard side of the encoder, via the sensor holder. The seal includes a first annular sealing plate and a second annular sealing plate mounted on the sensor holder and the inner ring, respectively, and opposite toward each other. Thus, it is possible to prevent ingress of foreign matter from outside of the bearing apparatus, such as magnetic powder, into a space between the magnetic encoder and the detecting portion of the wheel speed sensor even before the stem portion of the outer joint member is inserted into the wheel hub. The ingress is prevented even though it includes a course where the bearing apparatus is transferred to an assembly line of a manufacturer of automobiles. Also, ingress is prevented under severe circumstances in real running conditions of the vehicle. Thus, it is possible to remarkably improve the reliability of detection of the wheel rotation speed.

Another wheel bearing apparatus with an incorporated wheel speed detecting apparatus comprises an outer member with double row outer raceway surfaces formed on its inner circumferential surface. An inner member includes a wheel hub with an integrally formed wheel mounting flange at one end. A cylindrical portion axially extends from the wheel mounting flange. An inner ring is fit onto the cylindrical portion of the wheel hub. Double row inner raceway surfaces, opposite to the double row outer raceway surfaces, are formed on the outer circumferential surfaces of the wheel hub and inner ring, respectively. Double row rolling elements are arranged between the outer and inner raceway surfaces. An encoder is mounted on the outer circumferential surface of the inner ring. A sensor holder includes an annular fitting member. A holding member, in which a wheel rotation speed detecting sensor is embedded, is arranged opposite to the encoder via a predetermined radial gap. The encoder has an annular ring configuration with its characteristics alternately and equidistantly varying along its circumferential direction. The sensor holder is arranged radially inward from the outer circumferential surface of a knuckle fitting surface of the outer member. Terminals, for taking out output signals from the wheel rotation speed detecting sensor, extend radially outward and are connected to wire harnesses circumferentially arranged along the end surface of the outer member. Accordingly, it is possible to simplify the wheel rotation speed detecting sensor and its associated parts. Thus, this further improves the workability of assembly and prevents the holding member and the wire harnesses from projecting radially outward and causing interference with the suspension apparatus of vehicle.

A wheel bearing apparatus with an incorporated wheel speed detecting apparatus comprises an outer member with double row outer raceway surfaces formed on its inner circumferential surface. An inner member includes a wheel hub with an integrally formed wheel mounting flange at one end. A cylindrical portion axially extends from the wheel mounting flange. An inner ring is fit onto the cylindrical portion of the wheel hub. Double row inner raceway surfaces, opposite to the double row outer raceway surfaces, are formed on the outer circumferential surfaces of the wheel hub and inner ring, respectively. Double row rolling elements are arranged between the outer and inner raceway surfaces. An encoder is mounted on the outer circumferential surface of the inner ring. An annular sensor holder is arranged on the end of the outer member opposite to the encoder. A wheel rotation speed detecting sensor is integrally molded with the sensor holder and arranged opposite to the encoder via a predetermined radial gap. The encoder has an annular ring configuration with its characteristics alternately and equidistantly varying along its circumferential direction. A seal is arranged at the inboard side of the encoder, via the sensor holder. The seal includes a first annular sealing plate and a second annular sealing plate mounted on the sensor holder and the inner ring, respectively, and opposite toward each other.

DRAWINGS

Additional advantages and features will become apparent from the subsequent description and the appended claims, taken in conjunction with the accompanying drawings, wherein:

Figure 8:
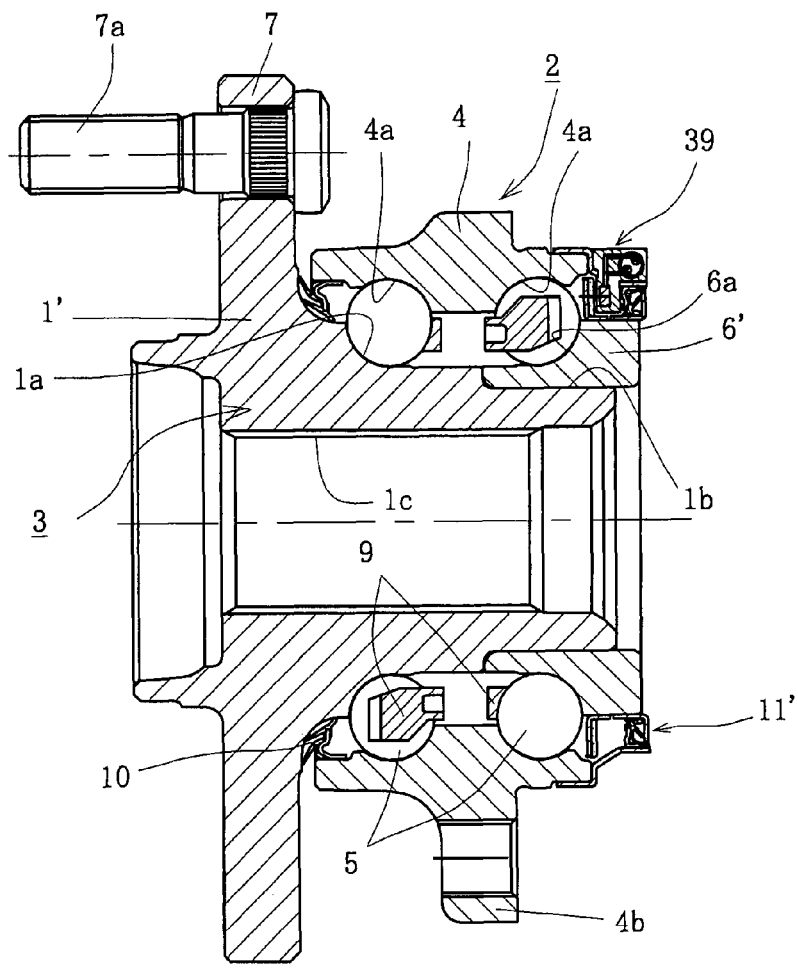
FIG. 8 is a longitudinal-section view of a seventh embodiment of a wheel bearing apparatus with an incorporated wheel speed detecting apparatus.
Figure 10:
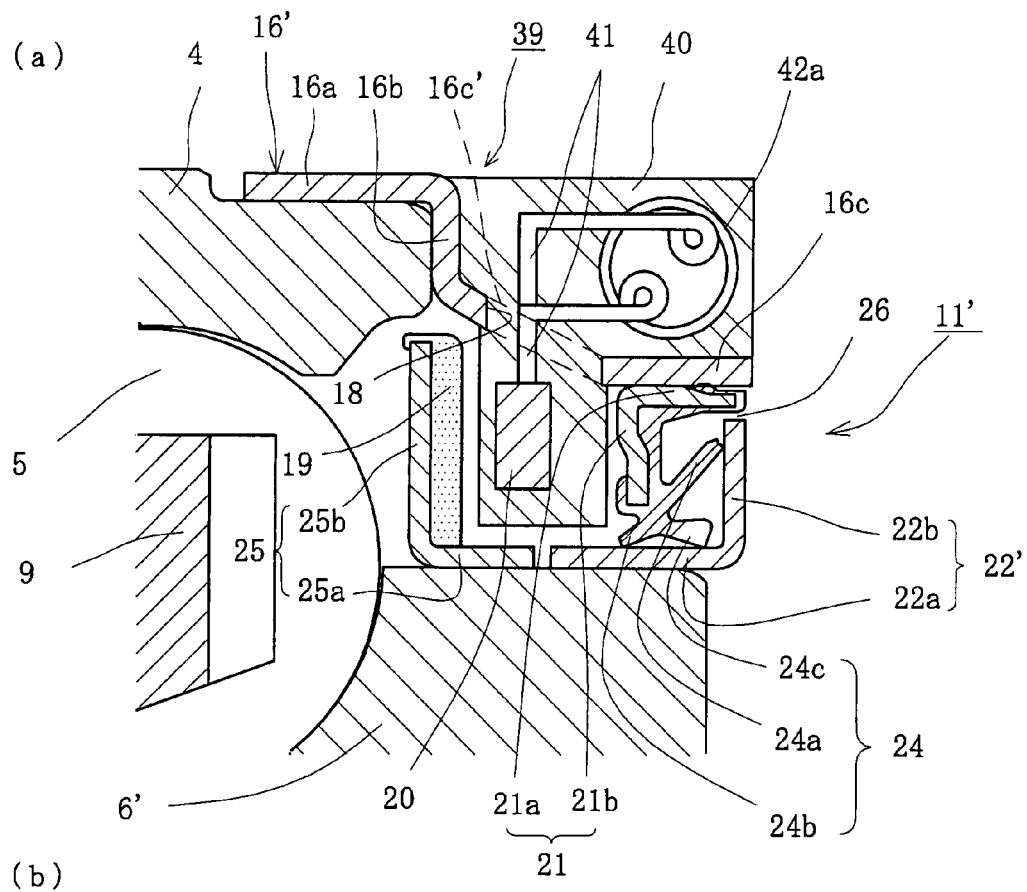
Figure 10:
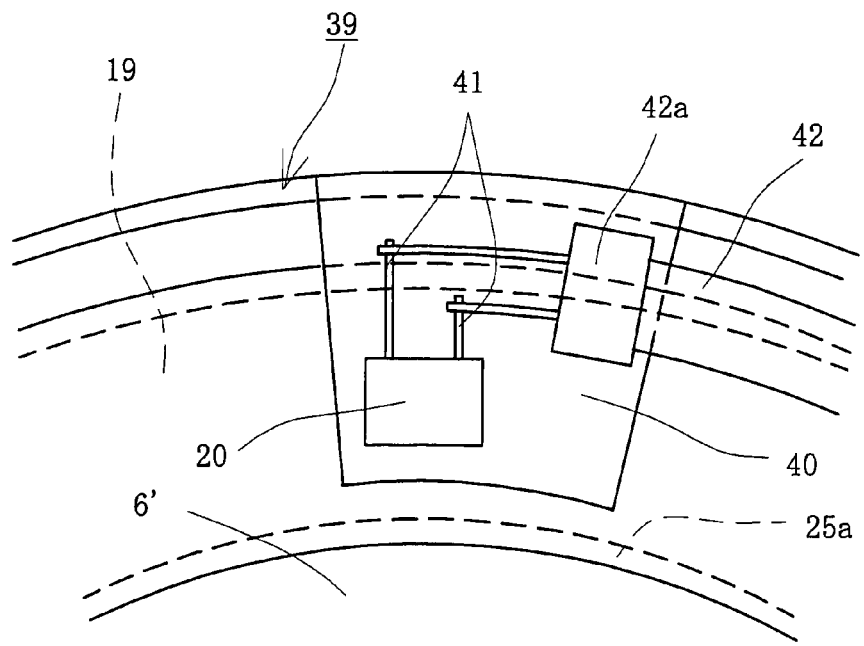
Figure 11:
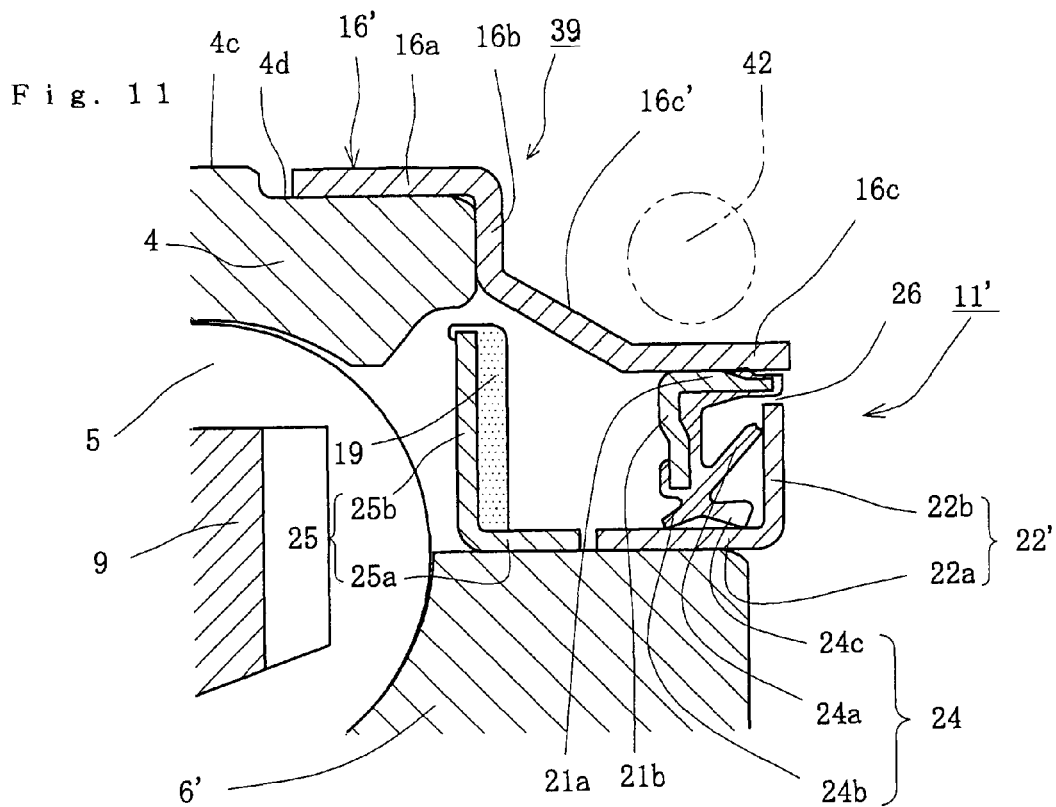
Figure 12:
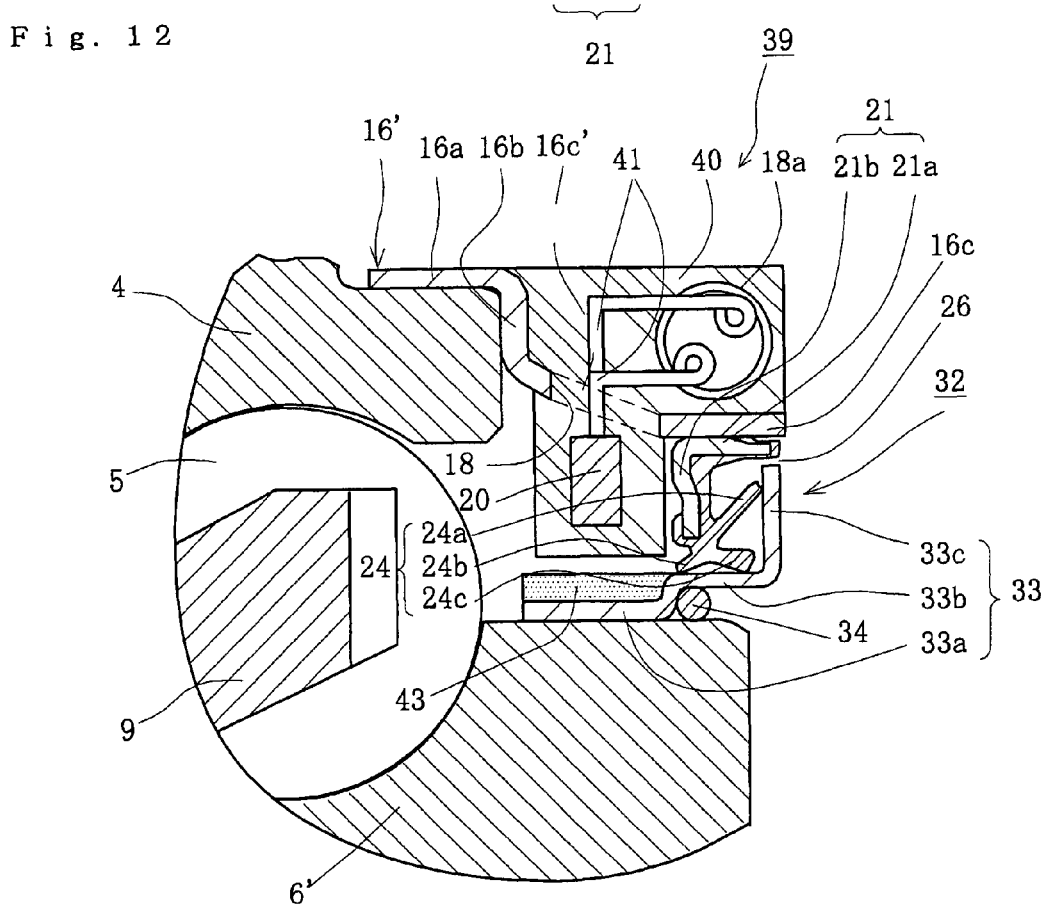
Figure 13:
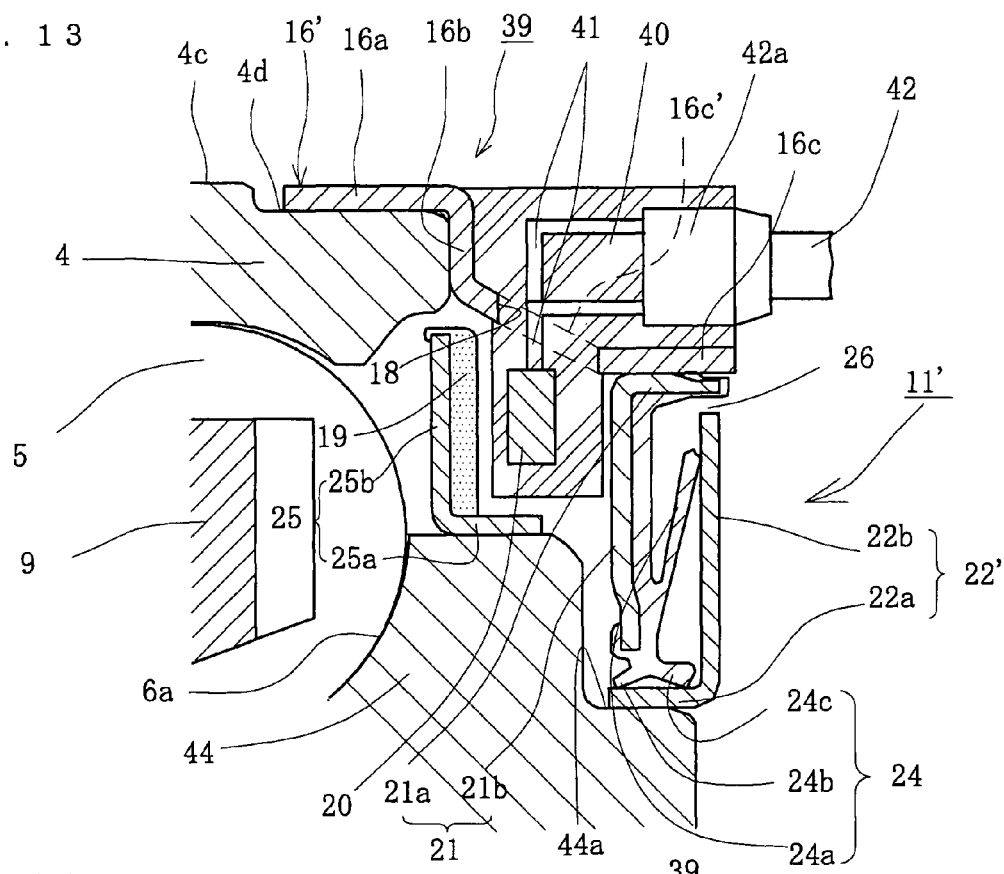
Figure 14:
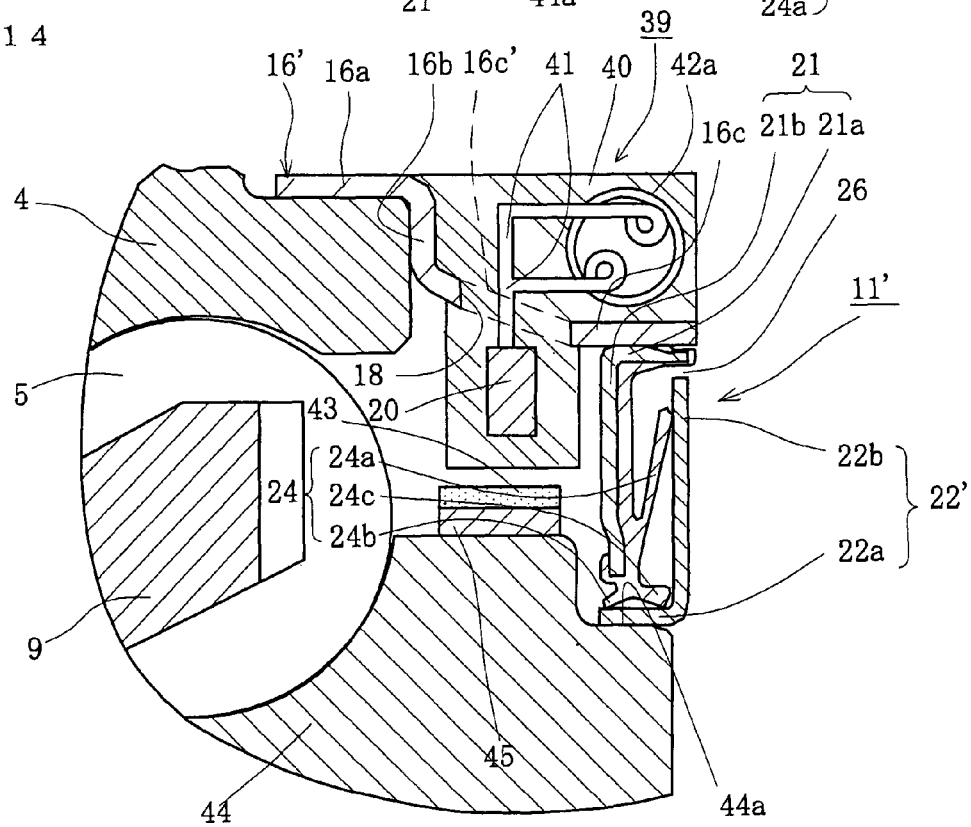
Figure 15:
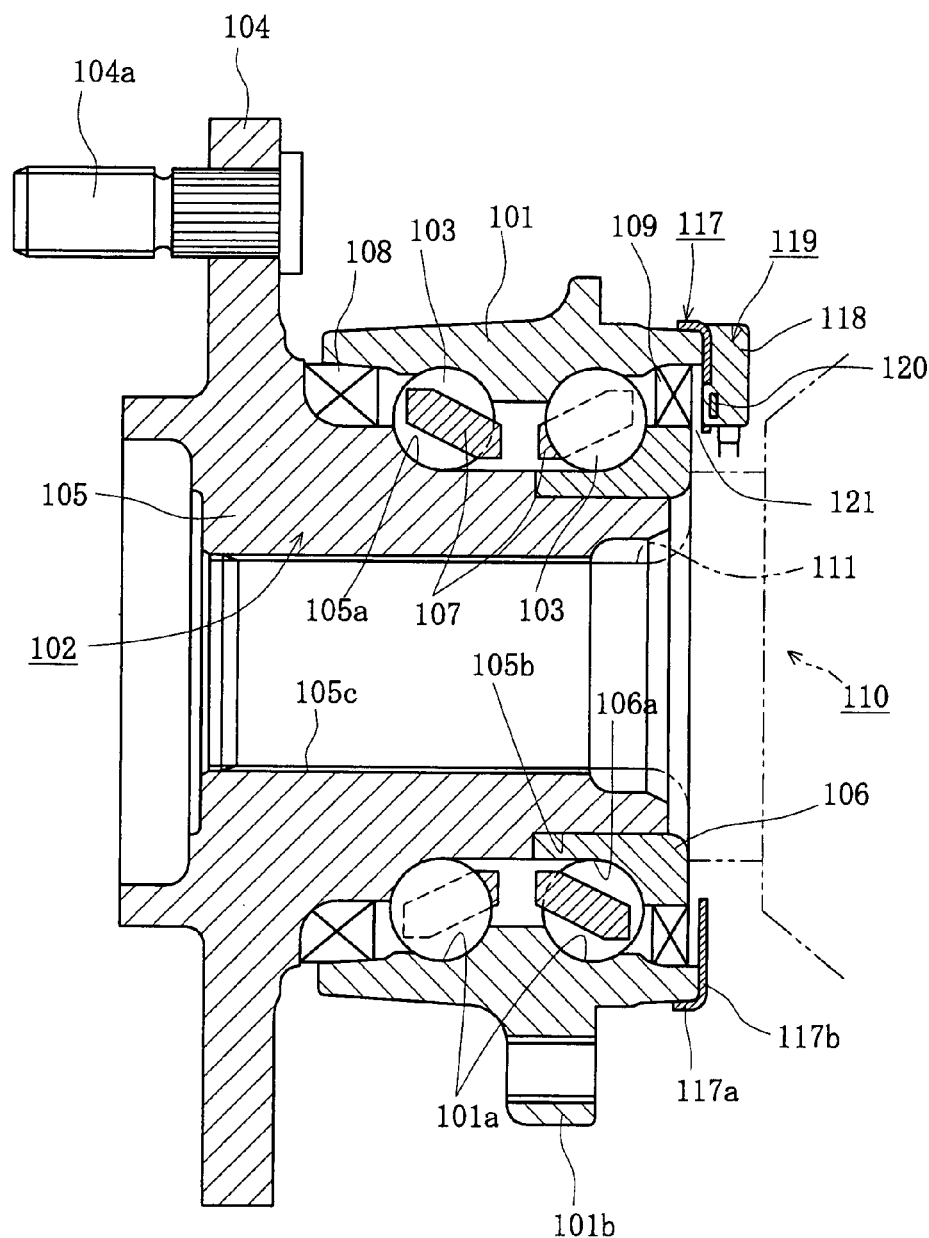
Figure 16:
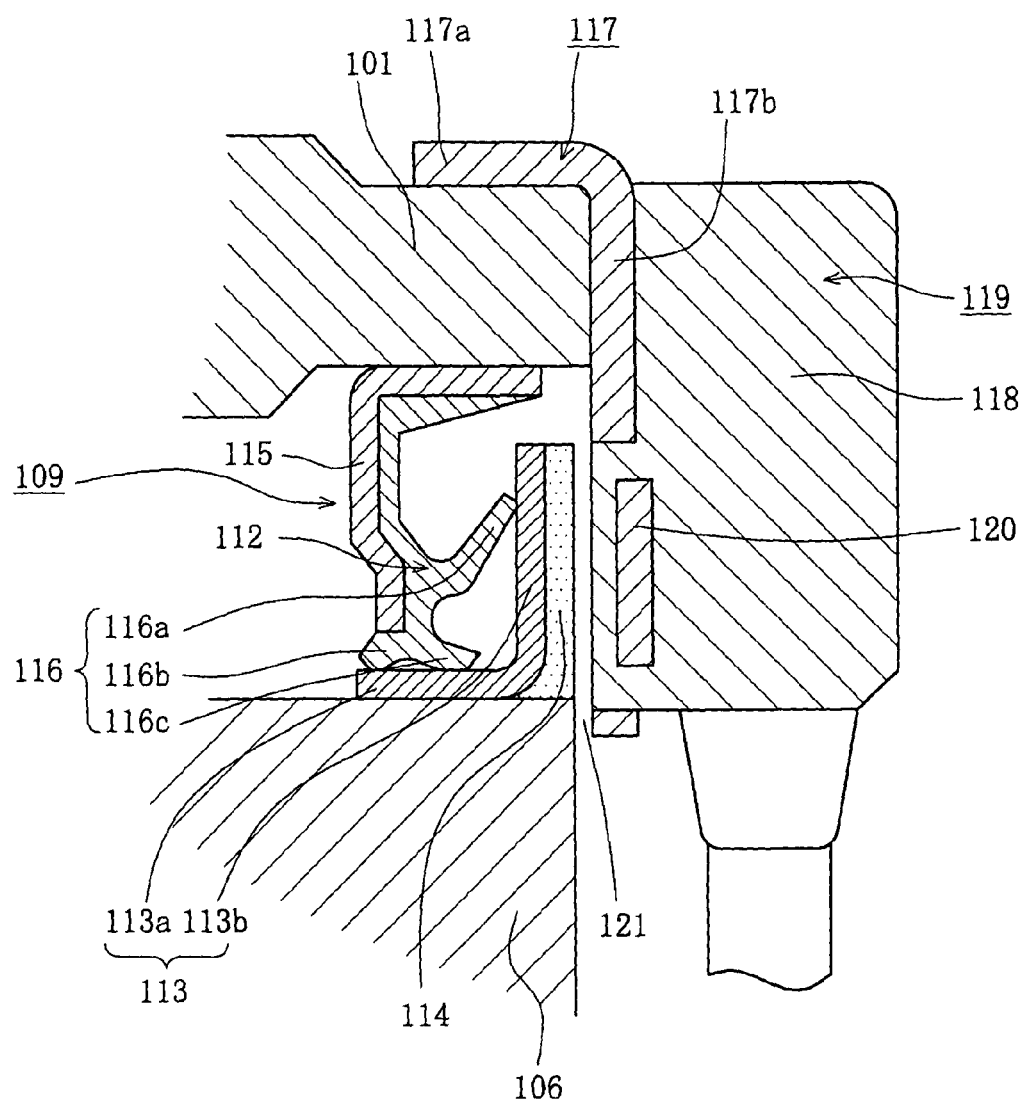

FIGS. 10(a) and 10(b) are a partially enlarged cross sectional view and a side elevation view, respectively, of FIG. 8;

FIG. 11 is a partially enlarged cross sectional view of FIG. 8 at a position different from that of FIG. 10(a);

FIG. 12 is a partially enlarged view of an eighth embodiment of a wheel bearing apparatus with an incorporated wheel speed detecting apparatus;

FIG. 13 is a partially enlarged view of a ninth embodiment of a wheel bearing apparatus with an incorporated wheel speed detecting apparatus;

FIG. 14 is a partially enlarged view of a tenth embodiment of a wheel bearing apparatus with an incorporated wheel speed detecting apparatus;

FIG. 15 is a longitudinal-section view of a prior art wheel bearing apparatus with an incorporated wheel speed detecting apparatus; and FIG. 16 is a partially enlarged cross sectional view of FIG. 15.

DETAILED DESCRIPTION

Preferred embodiments of the present invention will be described with reference to accompanied drawings.

Figure 1:
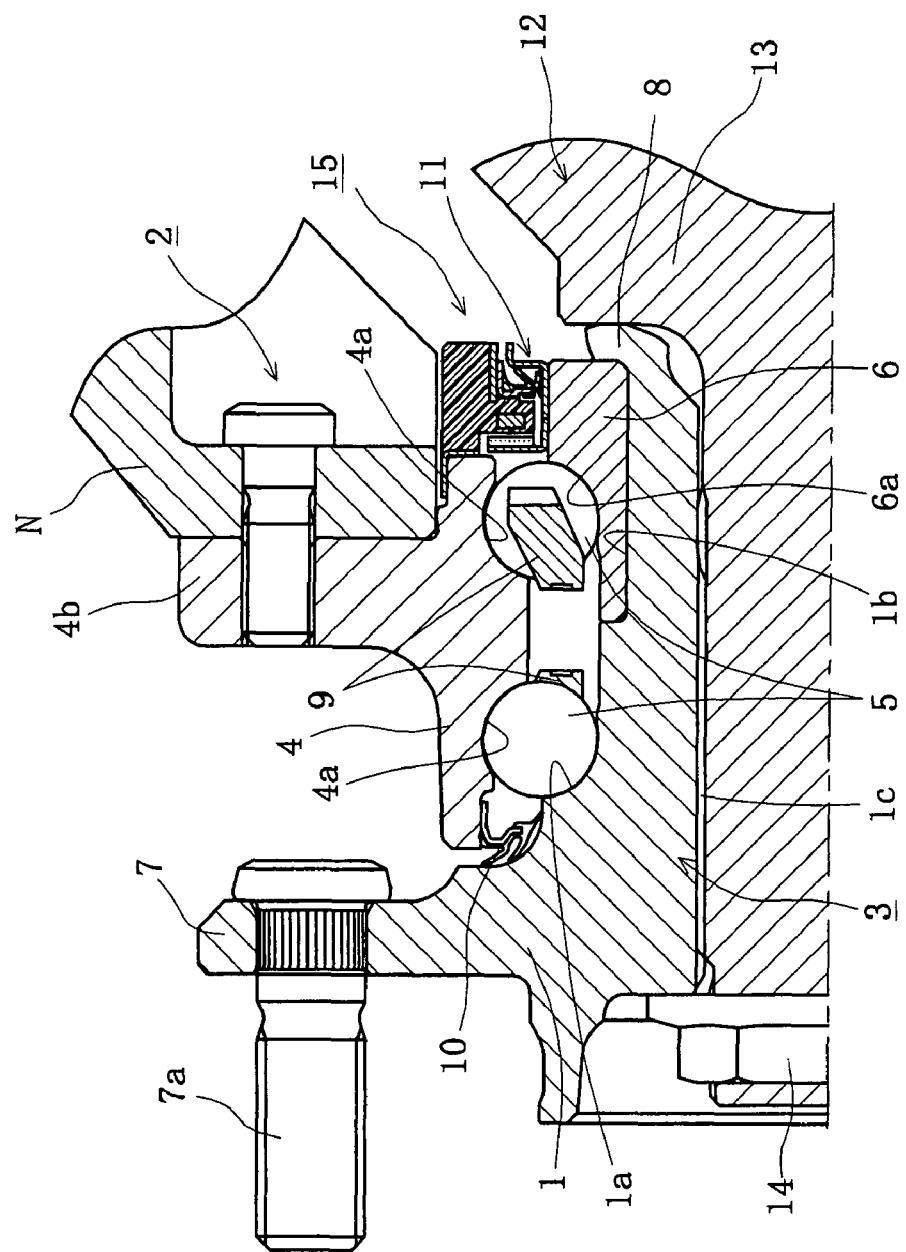
FIG. 1 is a longitudinal-section view of a first embodiment of a wheel bearing apparatus with an incorporated wheel speed detecting apparatus.
Figure 2:
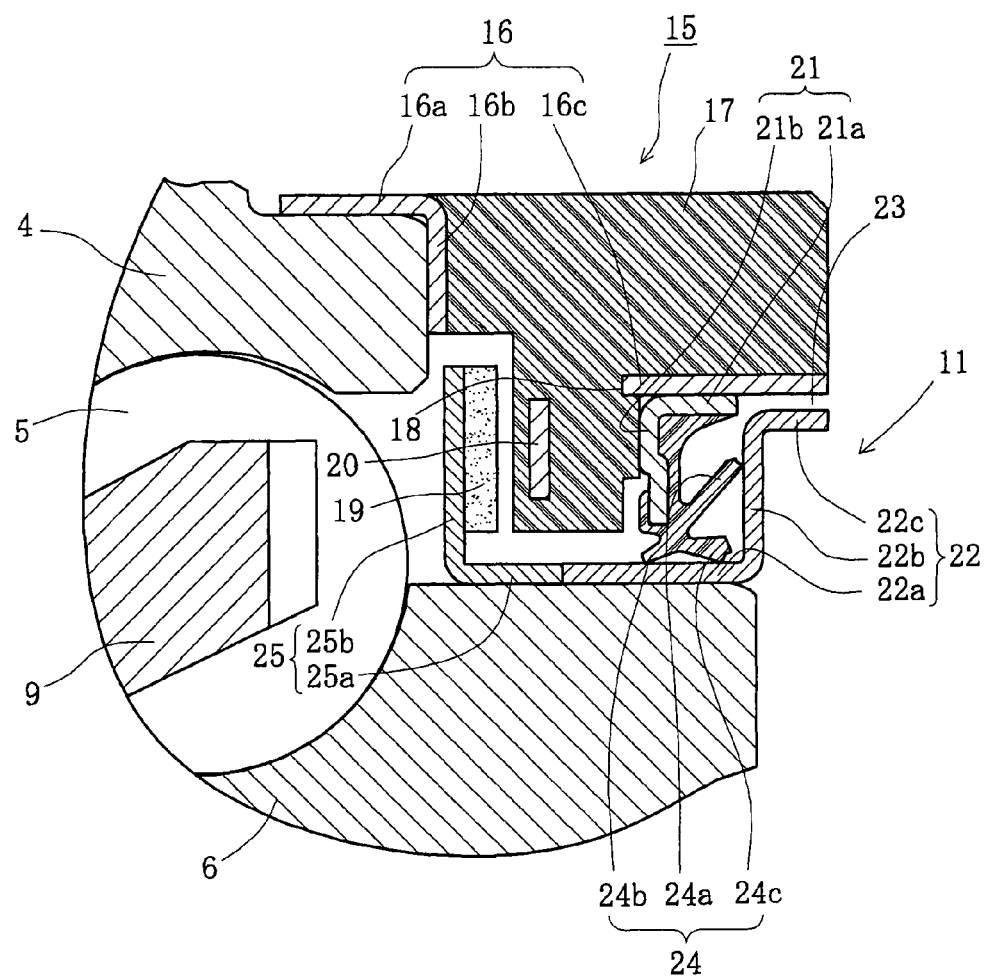
FIG. 2 is a partially enlarged longitudinal-section view of FIG. 1.

FIG. 1 is a longitudinal-section view of a first embodiment of a wheel bearing apparatus with an incorporated wheel speed detecting apparatus. FIG. 2 is a partially enlarged longitudinal-section view of FIG. 1. In the description of the present invention, an outer side of a bearing apparatus, when it is mounted on a vehicle, is referred to as "outboard" side (the left side in a drawing). An inner side of a bearing apparatus, when it is mounted on a vehicle, is referred to as the "inboard" side (the right side in a drawing).

The wheel bearing apparatus with an incorporated wheel speed detecting apparatus is for a driving wheel where a wheel hub 1 and a double row rolling bearing 2 are formed as a unit arrangement. Thus, this structure is a so-called "third generation".

The double row rolling bearing 2 includes an outer member 4, an inner member 3, and double row rolling elements (balls) 5 and 5. The outer member 4 is made of medium carbon steel including carbon of 0.40~0.80% by weight. The outer member 4 is formed with a body mounting flange 4a at its outer circumferential surface. The body mounting flange 4b is adapted to be mounted on a knuckle N. Outer raceway surfaces 4a, 4a are formed on its inner circumferential surface. The double row outer raceway surfaces 4a and 4a are hardened by high frequency induction quenching to have a surface hardness of 54~64 HRC.

The wheel hub 1 is integrally formed with a wheel mounting flange 7 for mounting a wheel (not shown) at its outboard end. Hub bolts 7a are secured at circumferentially equidistant positions on the flange 7. The outer circumferential surface of the wheel hub 1 is formed with one inner raceway surface 1a. The inner raceway surface 1 a corresponds to one of the double row outer raceway surfaces 4a and 4a. A cylindrical portion 1b axially extends from the inner raceway surface 1a. A caulked portion 8 is formed by plastically deforming the end of the cylindrical portion 1b radially outward. An inner ring 6 is press-fit onto the cylindrical portion 1b. The inner ring 6 is formed with the other inner raceway surface 6a which corresponds to the other of the double row outer raceway surfaces 4a and 4a. The inner ring 6 is axially immovably secured relative to the wheel hub 1 by the caulked portion 8. Thus, it forms a so-called self-retaining structure. Thus, it is possible to reduce the weight and size of the bearing apparatus to improve the strength and durability of the wheel hub 1. This also maintains an amount of preload on the bearing apparatus for a long term since any fastening means, such as a nut, is not required to control the amount of preload of the bearing apparatus. In this description of the present disclosure, the inner member 3 includes the wheel hub 1 and the inner ring 6 is press-fit on the wheel hub 1.

The double row rolling elements 5 and 5, held by cages 9 and 9, are contained between the outer raceway surfaces 4a and 4a of the outer member 4 and the oppositely arranged inner raceway surfaces 1a and 6a. Seals 10 and 11 are arranged at the ends of the outer member 4 to prevent the leakage of grease contained within the bearing apparatus as well as ingress of rain water or dusts.

The wheel hub 1 is made of medium carbon steel such as S53C including carbon of 0.40~0.80% by weight. The wheel hub 1 is formed with a hardened layer having a surface hardness of 54~64 HRC by high frequency induction hardening.

The hardened surface extends from the seal land portion, which the outboard seal 10 sliding contacts, to the inner raceway surface 1a and cylindrical portion 1b. The caulked portion 8 is not heat treated and has a surface hardness less than 25 HRC. Thus, it is possible not only to improve the wear resistance of the seal land forming the base of the wheel mount flange 7 but to provide a sufficient mechanical strength against the rotary bending load applied to the wheel mount flange 7. Thus, this improves the durability of the wheel hub 1. In addition it is possible to improve the workability of the caulked portion 8 during plastic deformation and to prevent the generation of cracking during deformation and thus to improve the reliability and quality.

The wheel hub 1 is formed with a serration (or spline) 1c on its inner peripheral surface. An outer joint member 12, forming a constant velocity universal joint, is inserted into the serration. A shoulder 13 of the outer joint member 12 abuts the caulked portion 8 of the wheel hub and is axially secured integrally with the wheel hub 1 by a nut 14.

As clearly shown in FIG. 2, a sensor holder 15, having an annular configuration, includes an annular fitting member 16 and a holding member 17. The sensor holder 15 is fit onto the end of the outer member 4. The annular fitting member 16 is formed as an annular body and includes a cylindrical fitting portion 16a press-fit onto the outer circumferential surface of the outer member 4. A flange portion 16b extending radially inward from the fitting portion 16a and adapted to be in close contact with the end surface of the outer member 4. A cylindrical portion 16c extends axially from the flange portion 16b. The annular fitting member 16 is press-formed from stainless steel which has corrosion resistance. The holding member 17 is integrally molded with the annular fitting member 16 and is provided with several apertures 18 on the cylindrical portion 16c. The seal 11 is arranged at the inboard side of the sensor holder 15.

A wheel speed detecting sensor 20 is embedded within the holding member 17. The sensor 20 is arranged opposite to a magnetic encoder 19, via a predetermined radial gap. The wheel speed sensor 20 includes a magnetic detecting element, such as a Hall element, a magnetic resistance element (MR element) etc. changing characteristics in accordance with the flowing direction of magnetic flux, and an IC incorporated with a waveform shaping circuit for shaping the output waveform of the magnetic detecting element.

The inboard seal 11 includes first and second annular sealing plates 21 and 22. Each plate has a substantially "L" shaped cross-sectional configuration and is mounted, respectively, on the sensor holder 15 and the inner ring 6 and are arranged opposite toward each other. The second sealing plate 22 has a cylindrical portion 22a fit onto the inner ring 6. A standing portion 22b extends radially outward from the cylindrical portion 22a. An annular tongue 22c extends axially from the tip of the standing portion 22b. The annular tongue 22c opposes the cylindrical portion 16c of the sensor holder 15, via a small radial gap, to form a labyrinth seal 23. The second sealing plate 22 is made by press-forming austenitic stainless steel sheet (JIS SUS 304 etc.) or preserved cold rolled sheet (JIS SPCC etc.).

The first sealing plate 21 includes a cylindrical portion 21a fit into the sensor holder 15. A standing portion 21b extends radially inward from one end of the cylindrical portion 21a. A sealing member 24 is adhered to the sealing plate 21 via vulcanized adhesion. The sealing member 24 has a side lip 24a, a grease lip 24b and a medium lip 24c and is made from an elastic material such as rubber etc.

The side lip 24a slidably contacts the standing portion 22b of the second sealing plate 22. The grease lip 24b and medium lip 24c slidably contact the cylindrical portion 22a of the second sealing plate 22. A steel base 25 is arranged on the inner ring 6 opposite to the inboard seal 11 with respect the holding member 17 of the sensor holder. The base 25 has a substantially "L" shaped cross-section and is press formed of ferromagnetic steel such as ferritic stainless steel sheet (JIS SUS 430 etc.) or preserved cold rolled sheet (JIS SPCC etc.). The base 25 includes a cylindrical portion 25a fitted on the inner ring 6. A standing portion 25b extends radially outward from the cylindrical portion 25a. A magnetic encoder 19 is adhered, via vulcanized adhesion, on the inboard surface of the standing portion 25a. The magnetic encoder 19 is formed of an elastomer, such as rubber etc., with intermixed magnetic powder. The magnetic encoder 19 has N and S poles alternately arranged along its circumferential direction to form a rotary encoder for detecting the wheel rotation speed.

As can be seen from the description of the first embodiment, the wheel speed sensor 20 is arranged within the sensor holder 15. The seal 11 is arranged at the inboard side of the wheel speed sensor 20. In addition, the labyrinth seal 23 is formed at the inboard side of the seal 11. Thus, it is possible to prevent ingress of foreign matter, from outside of the bearing apparatus, such as magnetic powder, into a space between the magnetic encoder 19 and the wheel speed sensor 20 even before the outer joint member 12 is inserted into the wheel hub 1. The ingress is prevented even though it includes a course where the bearing apparatus is transferred to an assembly line of a manufacturer of automobiles. It is also prevented under severe circumstances in real running conditions of the vehicle. Accordingly, it is also possible to remarkably improve the reliability of detection of the wheel rotation speed. In addition, it is possible to reduce the radial dimension of the wheel bearing apparatus, to simplify the associated parts of the sensor 20, and to improve the workability in assembly of the wheel bearing apparatus.

Although it is exemplary shown in this embodiment that the wheel rotation speed sensor 20 includes the magnetic encoder 19 and the magnetic detecting element such as Hall effect element, the wheel speed detecting apparatus is not limited to such a structure and may be a passive type apparatus including a magnetic encoder, magnets, and annular coils etc.

Figure 3:
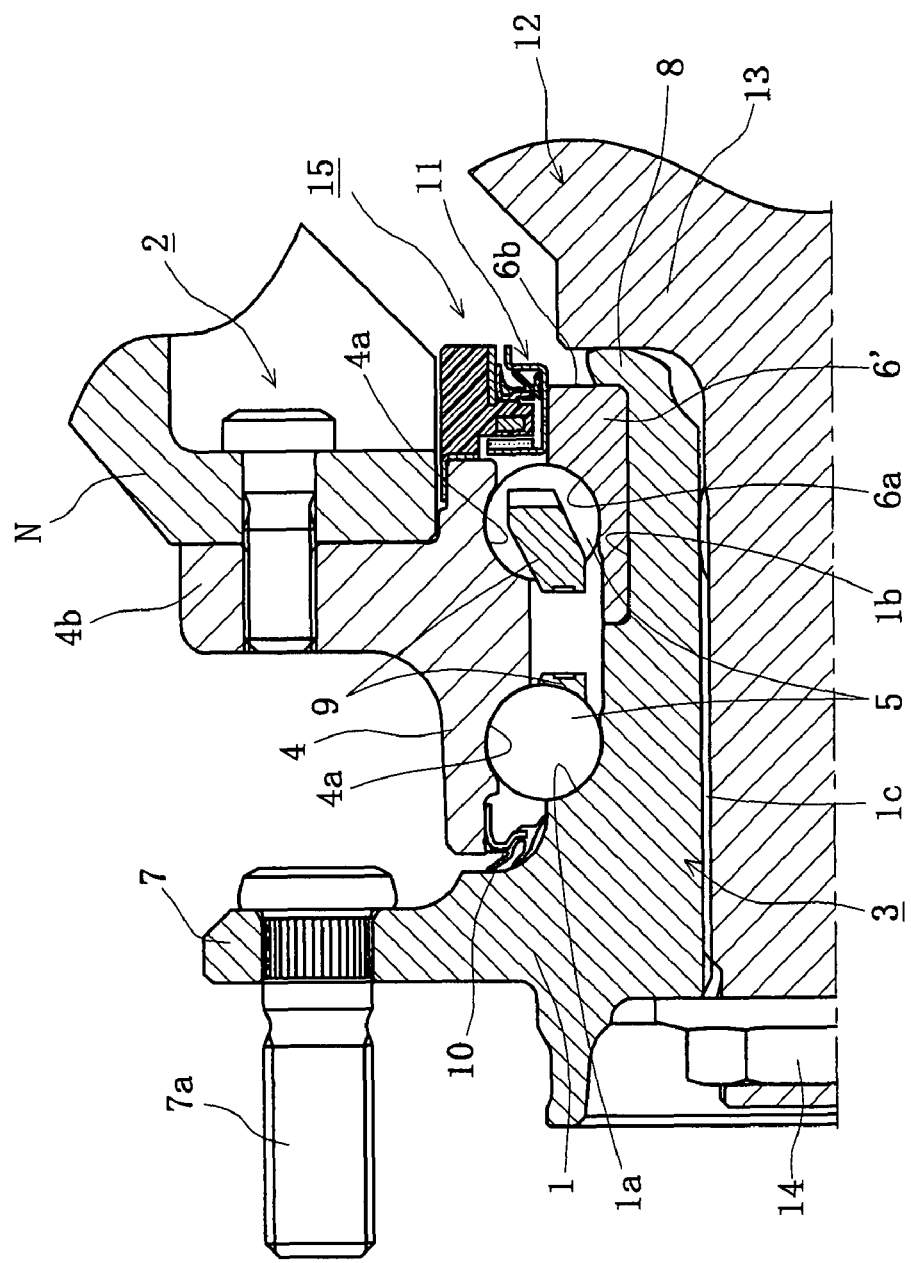
FIG. 3 is a longitudinal-section view of a second embodiment of a wheel bearing apparatus with an incorporated wheel speed detecting apparatus.

FIG. 3 is a partially enlarged view showing a second embodiment of the wheel bearing apparatus with an incorporated wheel speed detecting apparatus. This second embodiment is different from the first embodiment only in the mounting structure of the inboard seal 11. The same reference numerals are used in the second embodiment to designate the same parts having the same functions of parts as those used in the first embodiment.

Although the inboard seal 11 is same as that of the first embodiment, however, it differs from it in the mounting structure of the seal 11. The seal 11 is mounted on the sensor holder 15 and the inner ring 6'. The seal 11 includes the annular first and second sealing plates 21, 22 each having a substantially "L" shaped cross-section and arranged opposite toward each other. The cylindrical portion 22a of the second sealing plate 22 is fit onto the inner ring 6', which has an axial length shorter than the inner ring 6 of the first embodiment. Thus, the cylindrical portion 22a projects toward the inboard side from the larger end face 6b of the inner ring 6'. Thus it is possible to mount the inboard seal 11 on the inner ring having a smaller axial length (width) reduced to a minimum and thus to further reduce the weight and size of the bearing apparatus in order to improve the fuel consumption of vehicle.

Figure 4:
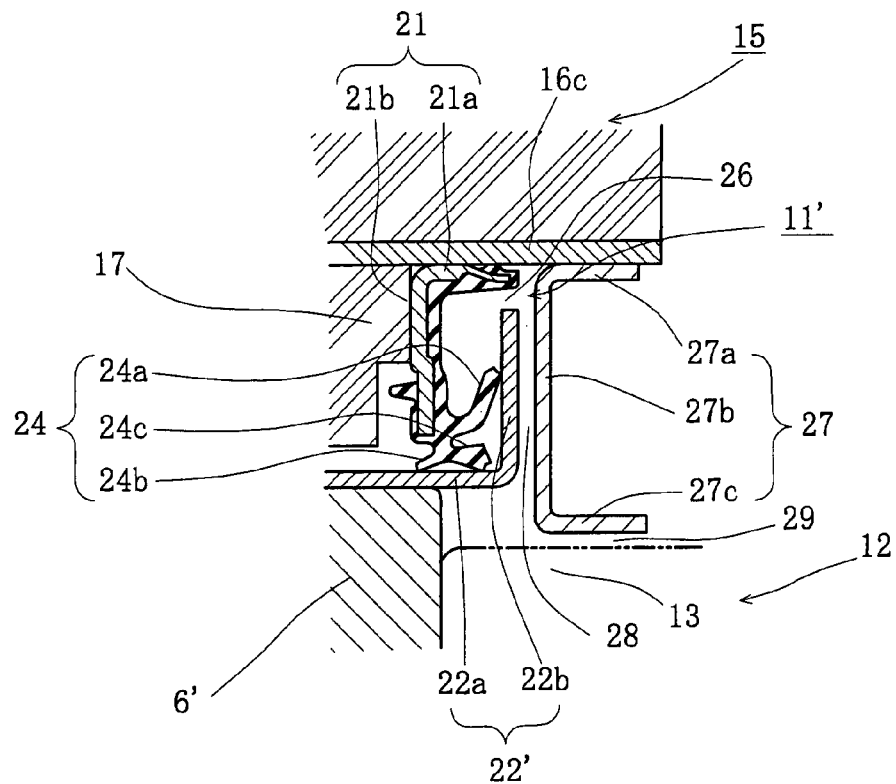
FIG. 4 is a partially enlarged view of a third embodiment of a wheel bearing apparatus with an incorporated wheel speed detecting apparatus.

FIG. 4 is a partially enlarged view showing a third embodiment of the wheel bearing apparatus with an incorporated wheel speed detecting apparatus. This third embodiment is different from the second embodiment only in the structure of the labyrinth seal. The same reference numerals are used in this third embodiment to designate the same parts having the same functions of the parts as those used in the second embodiment.

The inboard seal 11' includes first and second annular sealing plates 21 and 22'. Each plate 21, 22' has a substantially "L" shaped cross-sectional configuration and is mounted on the sensor holder 15 and the inner ring 6', respectively, opposite toward each other. The second sealing plate 22' includes cylindrical portion 22a fit onto the inner ring 6'. A standing portion 22b extends radially outward from the cylindrical portion 22a. The standing portion 22b opposes the cylindrical portion 21a of the first sealing plate 21, via a small radial gap, to form a labyrinth seal 26 therebetween.

In this embodiment, a shield 27 is additionally arranged at the inboard side of the seal 11'. The shield 27 includes a first cylindrical portion 27a adapted to be fit into the sensor holder 15. A standing portion 27b extends radially inward from the first cylindrical portion 27a. A second cylindrical portion 27c extends axially from the standing portion 27b. The shield 27 has a substantially "C" shaped cross-sectional configuration. The standing portion 27b and the standing portion 22b of the second sealing plate 22' oppose each other and are separated by a small axial gap which forms a labyrinth seal 28 therebetween. In addition, the second cylindrical portion 27c of the shield 27 and the shoulder 13 of the outer joint member 12 oppose each other, via a small radial gap, to form a labyrinth seal 29 therebetween.

As can be clearly understood, according to this third embodiment, the shield 27 is arranged at the inboard side of the seal 11'. Thus, labyrinth seal 28, between the seal 11' and the shield 27, labyrinth seal 29, between the shoulder 13 of the outer joint member 12 and the shield 27, and labyrinth seal 26 of the seal 11' are formed. Accordingly, it is possible to prevent ingress of foreign matter from outside of the bearing apparatus, such as magnetic powder, into a space between the magnetic encoder 19 and the wheel speed sensor 20 even before the outer joint member 12 is inserted into the wheel hub 1. The ingress is prevented even though it includes a course where the bearing apparatus is transferred to an assembly line of a manufacturer of automobiles. It is also prevented under severe circumstances in real running conditions of the vehicle.

Figure 5:
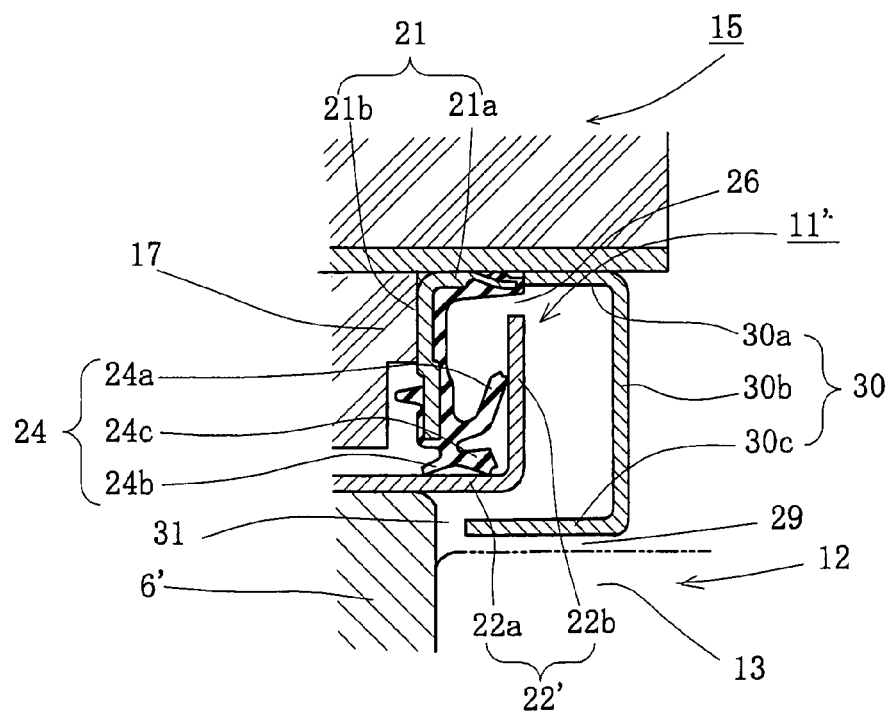
FIG. 5 is a partially enlarged view of a fourth embodiment of a wheel bearing apparatus with an incorporated wheel speed detecting apparatus.

FIG. 5 is an enlarged view showing a fourth embodiment of the wheel bearing apparatus with an incorporated wheel speed detecting apparatus. This fourth embodiment is a modification of the third embodiment (FIG. 4) and is different from it only in the configuration of the shield. The same reference numerals are used in the fourth embodiment to designate the same parts having the same functions of the parts as those used in the previous embodiments.

A shield 30 is additionally arranged at the inboard side of the seal 11'. The shield 30 includes a first cylindrical portion 30a adapted to be fit into the sensor holder 15. A standing portion 30b extends radially inward from the first cylindrical portion 30a. A second cylindrical portion 30c extends axially from the standing portion 30b. The shield 30 has a substantially "C" shaped cross-sectional configuration. The second cylindrical portion 30c and the shoulder 13 of the outer joint member 12 and the end surface of the inner ring 6' oppose one another via a small radial and axial gap to form labyrinth seals 29 and 31, respectively, therebetween.

As can be clearly understood, according to this fourth embodiment, the shield 30 is arranged at the inboard side of the seal 11'. Thus, labyrinth seals 29 and 31 are formed between the shield 30 and the shoulder 13 of the outer joint member 12 and the end surface of the inner ring 6' in addition to the labyrinth seal 26 of the seal 11'. Accordingly, it is possible to prevent ingress of foreign matter from outside of the bearing apparatus, such as magnetic powder, into a space between the magnetic encoder 19 and the wheel speed sensor 20 even before the outer joint member 12 is inserted into the wheel hub 1. The ingress is prevented even though it includes a course where the bearing apparatus is transferred to an assembly line of a manufacturer of automobiles. It is also prevented under severe circumstances in real running conditions of the vehicle.

Figure 6:
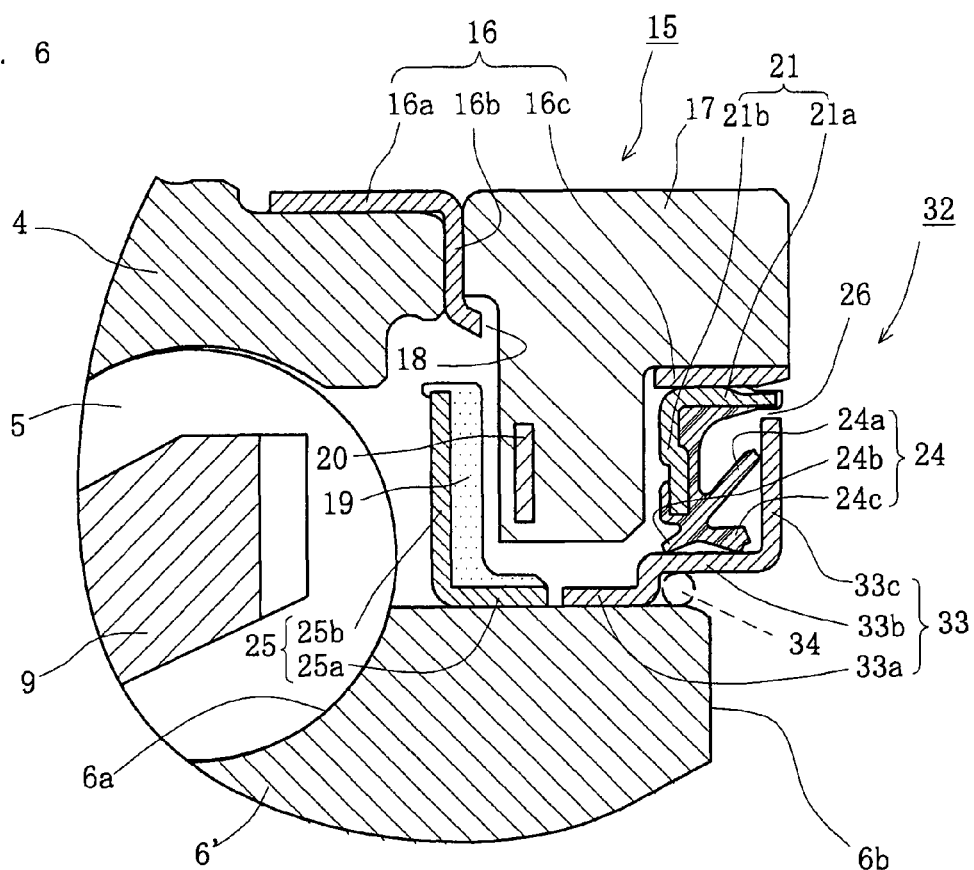
FIG. 6 is a partially enlarged view of a fifth embodiment of a wheel bearing apparatus with an incorporated wheel speed detecting apparatus.

FIG. 6 is a partially enlarged view of a fifth embodiment of a wheel bearing apparatus with an incorporated wheel speed detecting apparatus. This fifth embodiment is different from the second embodiment (FIG. 3) only in a portion of the inboard seal. The same reference numerals are used in the fifth embodiment to designate the same parts having the same functions of the parts as those used in the previous embodiments.

In this embodiment the annular sensor holder 15 is mounted on the end of the outer member 4. The sensor holder 15 includes an annular fitting member 16 and a holding member 17 connected to the annular fitting member 16.

An inboard seal 32 includes first and second annular sealing plates 21 and 32. Each plate has a substantially "L" shaped cross-sectional configuration and is mounted, respectively, on a cylindrical portion 16c of the annular fitting member 16 and the inner ring 6'. The plates 21 and 32 are arranged opposite toward each other. The first sealing plate 21 includes a cylindrical portion 21a fit into the sensor holder 15. A standing portion 21b extends radially inward from one end of the cylindrical portion 21a. A sealing member is made of elastic material such as rubber etc. and is adhered to the sealing plate 21 via vulcanized adhesion. The sealing member 24 has a side lip 24a, a grease lip 24b and a medium lip 24c.

The second sealing plate 33 is made by press-forming an austenitic stainless steel sheet (JIS SUS 304 etc.) or a preserved cold rolled sheet (JIS SPCC etc.). The second sealing plate 33 includes a cylindrical portion 33a fit onto the inner ring 6'. A larger cylindrical portion 33b is formed larger than the cylindrical portion 33a. A standing portion 33c extends radially outward from the larger cylindrical portion 33b.

The side lip 24a slidably contacts the standing portion 33c of the second sealing plate 33. The grease lip 24b and medium lip 24c slidably contact the larger cylindrical portion 33b of the second sealing plate 33. The tip end of the standing portion 33c of the second sealing plate 33 opposes the cylindrical portion 21a of the first sealing plate 21, via a small radial gap, to form a labyrinth seal 23 therebetween. The provision of the labyrinth seal 26 makes it possible to further improve the sealing tightness of the inboard seal 32.

The larger cylindrical portion 33b of the second sealing plate 33 projects toward the inboard side from the larger end face 6b of the inner ring 6'. Thus it is possible to mount the inboard seal 32 on the inner ring 6' having a smaller axial length (width) reduced to a minimum and thus to further reduce the weight and size of the bearing apparatus in order to improve the fuel consumption of vehicle.

According to this embodiment, the second sealing plate 33 is formed with a two-step structure, which includes the cylindrical portion 33a and the larger cylindrical portion 33b. Thus, it is possible to assure a sufficient rigidity of the second sealing plate 33 even though the larger cylindrical portion 33b projects from the larger end face 6b of the inner ring 6'.

In addition, a ring shaped elastic member 34, such as an "O" ring, is elastically fit within an annular space between the larger cylindrical portion 33b and the outer circumferential surface of the inner ring 6'. This makes it possible to remarkably improve the tightness of seal in the fitting portion between the larger cylindrical portion 33b and the inner ring 6'. Thus, this prevents ingress of rain water or dusts from the environment into the bearing over the long term.

Figure 7:
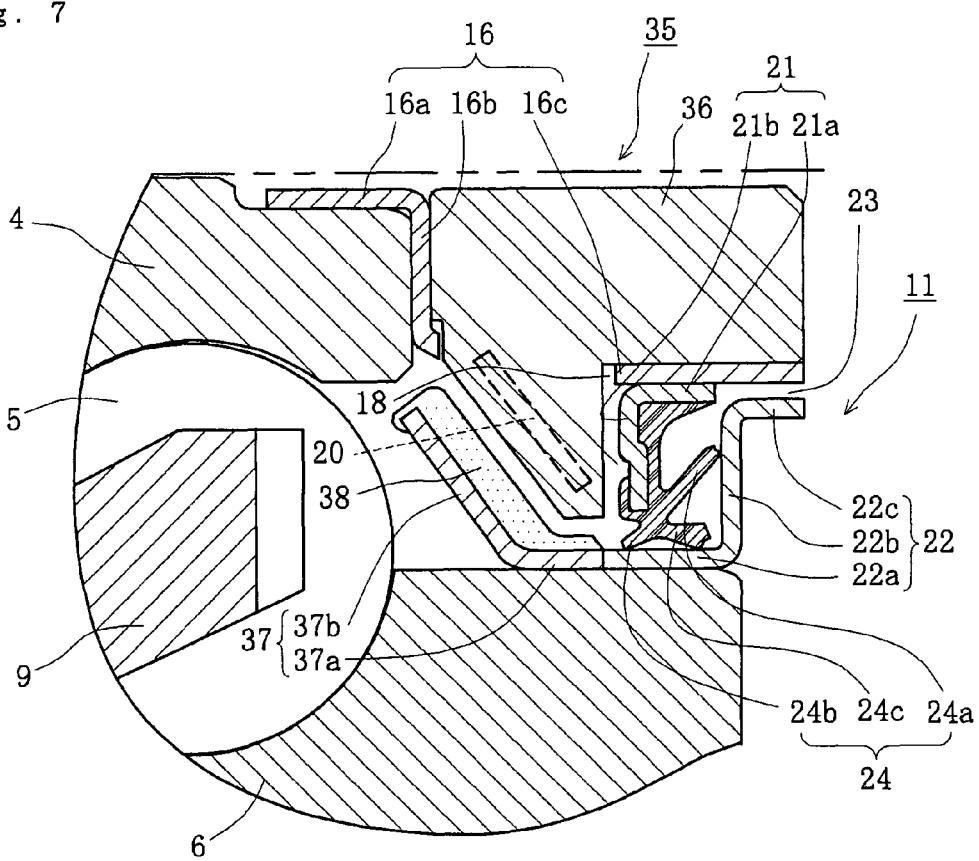
FIG. 7 is a partially enlarged view of a sixth embodiment of a wheel bearing apparatus with an incorporated wheel speed detecting apparatus.

FIG. 7 is a partially enlarged view of a sixth embodiment of a wheel bearing apparatus with an incorporated wheel speed detecting apparatus. This sixth embodiment is different from the first embodiment (FIG. 2) only in the structure of the detecting portion. The same reference numerals are used in the sixth embodiment to designate the same parts having the same functions of the parts as those used in the previous embodiments.

In this embodiment an annular sensor holder 35 is mounted on the end of the outer member 4. The sensor holder includes the annular fitting member 16 and a holding member 36. The annular fitting member 16 is formed as a generally annular configuration and includes a cylindrical fitting portion 16a to be fit onto the outer member 4. A flange portion 16b extends radially inward from the fitting portion 16a. A cylindrical portion 16c axially extends from the flange portion 16b. A plurality of apertures 18 is formed circumferentially in the cylindrical portion 16c. The holding member 36 is integrally molded from synthetic resin with the annular fitting member 16. The sensor holder 35 is press fit onto the end of the outer member 4 with the seal 11 being mounted between the cylindrical portion 16c of the sensor holder 35 and the inner ring 6. The flange portion 16b contacts the end face of the outer member 4. This makes it possible to reduce the radial dimension of the wheel bearing apparatus, to simplify the associated parts of wheel rotation speed detecting sensor, and thus to further improve the workability of assembly.

A steel base 37 is arranged on the inner ring 6 opposite to the inboard seal 11 with respect the holding member 36 of the sensor holder. The steel base 37 is press fit on the inner ring 6. The base 37 is formed to have a substantially "L" shaped cross-section by press forming ferromagnetic steel such as ferritic stainless steel sheet (JIS SUS 430 etc.) or preserved cold rolled sheet (JIS SPCC etc.). The base 37 comprises a cylindrical portion 37a fit onto the inner ring 6. A standing portion 37b extends radially outward at an angle from the cylindrical portion 37a. A magnetic encoder 38 is adhered, via vulcanized adhesion, onto the inboard surface of the standing portion 37a. The magnetic encoder 38 is formed of an elastomer such as rubber etc. with intermixed magnetic powder. The magnetic encoder 38 has N and S poles alternately arranged along its circumferential direction and forms a rotary encoder for detecting the wheel rotation speed.

A wheel speed detecting sensor 20 is embedded within the holding member 36 and arranged opposite to a magnetic encoder 38 via a predetermined radial gap. The wheel speed sensor 20 includes a magnetic detecting element such as a Hall element, a magnetic resistance element (MR element) etc. changing characteristics in accordance with the flowing direction of magnetic flux, and an IC incorporated with a waveform shaping circuit for shaping the output waveform of the magnetic detecting element.

The inclination of the standing portion 37b on which the magnetic encoder 38 is adhered enables it to increase the volume of the magnet and thus to increase the magnetic flux density of the magnetic encoder. This makes it possible to set a large air gap between the encoder 38 and the sensor 20. Thus, this improves the freedom of design and simplifies the assembling workability. Also, the inclination of the standing portion 37b enables it to reduce the height of the sensor holder 35 itself and thus to contribute to reduce the size of the bearing portion.

Figure 9:
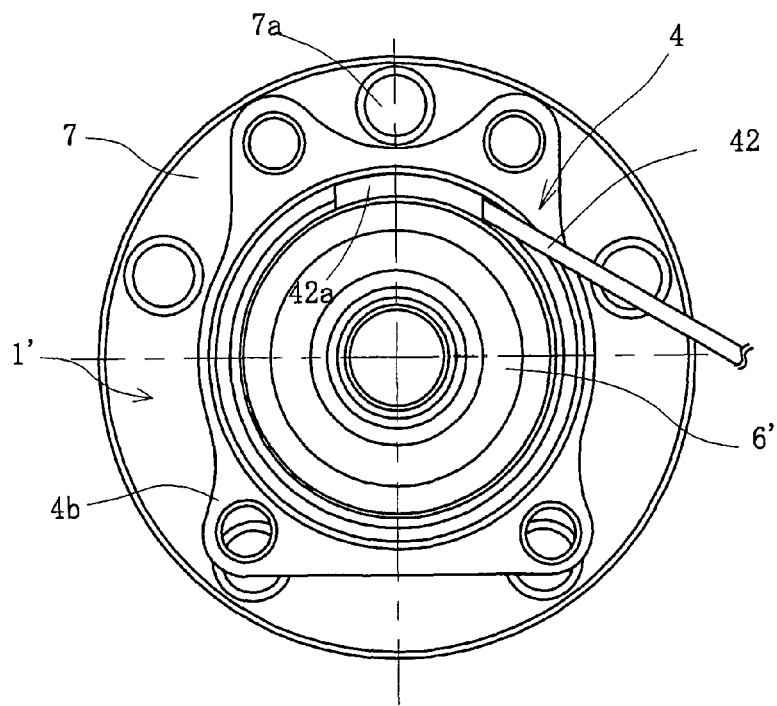
FIG. 9 is a side elevation view of FIG. 8.

FIG. 8 is a longitudinal-section view of a seventh embodiment of a wheel bearing apparatus with an incorporated wheel speed detecting apparatus. FIG. 9 is a side elevation view of FIG. 8. FIGS. 10(a) and 10(b) are a partially enlarged cross sectional view and a side elevation view, respectively, of FIG. 8. FIG. 11 is a partially enlarged cross sectional view of FIG. 8 at a position different from that of FIG. 10(a). This seventh embodiment is different from the previous embodiments only in the structure of the harnesses and their associated parts. The same reference numerals are used in the sixth embodiment to designate the same parts having the same functions of the parts as those used in the previous embodiments.

This wheel bearing apparatus with an incorporated wheel speed detecting apparatus is that for a driving wheel where a wheel hub 1' and a double row rolling bearing 2 are formed as a unit. Thus, the structure is a so-called "third generation".

The wheel hub 1' is integrally formed with a wheel mounting flange 7 to mount a wheel (not shown) at its outboard end. Hub bolts 7a are secured at circumferentially equidistant positions on the flange 7. The outer circumferential surface of the wheel hub 1' is formed with one inner raceway surface 1a (outboard side) which corresponds to one of the double row outer raceway surfaces 4a and 4a. A cylindrical portion 1b extends axially from the inner raceway surface 1a. The inner circumferential surface of the wheel hub 1' is formed with a serration (or spline) 1c. An inner ring 6' is press-fit onto the cylindrical portion 1b. The inner ring 6' is formed with the other inner raceway surface 6a (inboard side) which corresponds to the other of the double row outer raceway surfaces 4a and 4a. In this description, the inner member 3 includes the wheel hub 1' and the inner ring 6' is press-fit onto the wheel hub 1'.

A sensor holder 39 is fitted onto the inboard end of the outer member 4. As shown in the partially enlarged view of FIG. 10(a), the sensor holder 39 includes an annular fitting member 16' and a holding member 40 connected to the annular fitting member 16'. The annular fitting member 16' is formed as an annular body and includes a cylindrical fitting portion 16a press-fit onto the outer circumferential surface of the outer member 4. A flange portion 16b extends radially inward from the fitting portion 16a. A conical portion 16c' extends axially inboard from the flange portion 16b. A cylindrical portion 16c axially extends from the tip of the conical portion 16c'. The annular fitting member 16 is press-formed from stainless steel which has corrosion resistance. In order to prevent an adverse effect on the detecting performance of the sensor 20, it is preferable that the annular fitting member 16' is made of non-magnetic material such as austenitic stainless steel sheet (JIS SUS 304 etc.). This makes it possible to sustain high durability and detecting accuracy of the seal over the long term.

The holding member 40 is integrally molded with the annular fitting member 16' by extending through a plurality of apertures 18 on the cylindrical portion 16c'. The seal 11' is fit into the cylindrical portion 16c of the annular fitting member 16'. The sensor holder 39 is press fit onto the end of the outer member 4 with the flange portion 16b in contact with the end face of the outer member 4. Although it is shown that the holding member 40 is formed integrally with the annular fitting member 16', it is possible to mount the holding member 40 on the annular fitting member 16' with portions of the material of the holding member 40 projecting through the apertures 18.

The holding member 40 is formed of synthetic resin such as PA 66 (polyamide 66) to have a substantially "L" shaped cross-section. The wheel rotation speed detecting sensor 20 is embedded in the holding member 40 so that it is arranged opposite to an encoder 19, described more in detail later, via a predetermined axial air gap. As schematically shown in FIG. 10(b), terminals 41, for taking out output signal from the wheel rotation speed detecting sensor 20, extend radially outward and are connected to wire harnesses 42 circumferentially arranged along the end surface of the outer member 4, via a leading-out portion 42a. The wheel rotation speed detecting sensor 20, and the leading-out portion 42a, for connecting the terminals 41 and wire harnesses, are integrally molded within the holding member 40 by synthetic resin. This makes it possible to prevent damage and fall-out of the holding member 40 which would be caused by flying gravel during running of vehicle as well as the generation of corrosion of the terminals and the leading-out portion 42a of the wire harnesses 42. Thus, this improves the reliability of the bearing apparatus. In addition, it is possible to prevent the holding member 40 and the wire harnesses 42 from projecting radially outward from the outer member 4 and causing interference with the suspension apparatus (not shown) of the vehicle. Furthermore, since the leading-out portion 42a can be arranged within a space radially outward of the seal 11', it is possible to reduce the size of the holding member 40.

The inboard seal 11' includes first and second annular sealing plates 21 and 22'. Each plate has a substantially "L" shaped cross-sectional configuration and is mounted, respectively, on the annular fitting member 16' of the sensor holder 39 and the inner ring 6'. The plates 21, 22' are arranged opposite toward each other. The first sealing plate 21 comprises a cylindrical portion 21a fit into the sensor holder 39. A standing portion 21b extends radially inward from one end of the cylindrical portion 21a. A sealing member 24 is made of elastic material, such as rubber, etc., and is adhered to the first sealing plate 21 via vulcanized adhesion. The sealing member 24 has a side lip 24a, a grease lip 24b and a medium lip 24c.

The second sealing plate 22' is made by press-forming an austenitic stainless steel sheet (JIS SUS 304 etc.) or preserved cold rolled sheet (JIS SPCC etc.). The second sealing plate has a cylindrical portion 22a fit onto the inner ring 6'. A standing portion 22b extends radially outward from the cylindrical portion 22a. The side lip 24a slidably contacts the standing portion 22b of the second sealing plate 22'. The grease lip 24b and medium lip 24c slidably contact the cylindrical portion 22a of the second sealing plate 22'. The tip of the standing portion 22b of the second sealing plate 22' opposes the cylindrical portion 21a of the first sealing plate 21 to form a labyrinth seal 26 via a small radial gap. This makes it possible to further improve the sealing tightness of the inboard seal 11'.

The cylindrical portion 22a of the second sealing plate 22' is fit onto the inner ring 6'. The second sealing plate 22' has an axial length (width) sufficient to resist against a predetermined pulling out force and a portion of the cylindrical portion 22a and the standing portion 22b project toward the inboard side from the larger end face of the inner ring 6'. Thus, it is possible to reduce the weight and size of the bearing apparatus.

FIG. 11 is a cross-sectional view at a position circumferentially offset from that of FIG. 10 (a). As shown in FIG. 11, the taking-out portion of the harnesses 42 can be arranged at a position radially inward from the outer circumferential surface of the knuckle fitting surface 4c. It is at a position radially inward from the outer circumferential surface of the stepped portion 4d of the outer member 4 by taking out the harnesses 42 from the sensor holder 39 with extending them circumferentially. Thus, mounting of the bearing apparatus on a body of the vehicle with the knuckle fitting surface 4c of the outer member 4 being fit onto the knuckle "N" of the vehicle body is not interfered by the sensor 20 and the holder sensor 39. Accordingly, the assembly of the bearing apparatus to the knuckle "N" can be simply carried out and axial expansion of the harnesses 42 connected to the sensor 20 can be prevented. Thus, interference between the harnesses 42 and the constant velocity universal joint (not shown) can be prevented. In addition, since the harnesses 42 are taken out in a circumferential direction, the axial length of the bearing apparatus is not required to increase.

According to this embodiment, the sensor holder 39 is mounted on the annular fitting member 16' fit onto the end of the outer member 4. The annular fitting member 16' includes cylindrical fitting portion 16a fit onto the stepped portion 4d of the outer member 4. The flange portion 16b extends radially inward from the cylindrical fitting portion 16a. The conical portion 16c' projects towards the inboard side from the flange portion 16b. The cylindrical portion 16c axially extends from the tip of the conical portion 16c'. Thus, it is possible to arrange the sensor holder 39 in a radially inward space from the outer circumferential surface of the knuckle fitting surface 4c of the outer member 4. Especially, since the annular fitting member 16' for mounting the sensor holder 39 has a partially conical configuration, it is possible to create a radial space. Thus, it is possible to prevent the sensor holder 39 from projecting beyond the outer circumferential surface of the outer member 4.

FIG. 12 is a partially enlarged view of an eighth embodiment of a wheel bearing apparatus with an incorporated wheel speed detecting apparatus. This eighth embodiment is different from the seventh embodiment (FIG. 10) only in the structure of the detecting portion. The same reference numerals are used in this embodiment to designate the same parts having the same functions of the parts as those used in the seventh embodiment.

In this embodiment, the seal 32 is mounted in an annular space formed by the cylindrical portion 16c of the annular fitting member 16' and the inner ring 6'. The seal 32 is press fit onto the end of the outer member 4 with the flange portion 16b of the annular fitting member 16' in contact with the end face of the outer member 4.

The inboard seal 32 includes first and second annular sealing plates 21 and 33. Each plate 21, 33 has a substantially "L" shaped cross-sectional configuration and is mounted, respectively, on the sensor holder 39 and the inner ring 6'. The plates 21, 33 are arranged opposite toward each other. The second sealing plate 33 includes a cylindrical portion 33a fit onto the inner ring 6'. A larger cylindrical portion 33b extends axially from the cylindrical portion 33a. A standing portion 33c extends radially outward from the larger cylindrical portion 33c. The side lip 24a of the first sealing plate 21 slidably contacts the standing portion 33c of the second sealing plate 33. The grease lip 24b and medium lip 24c slidably contact the larger cylindrical portion 33b of the second sealing plate 33. A magnetic encoder 43 is adhered, via vulcanized adhesion, on the outer circumferential surface of the cylindrical portion 33a of the second sealing plate 33. The magnetic encoder 43 is formed from an elastomer such as rubber etc. with intermixed magnetic powder. The magnetic encoder 43 has N and S poles alternately arranged along its circumferential direction and forms a rotary encoder to detect the wheel rotation speed.

In addition, a ring shaped elastic member 34 such as an O ring is elastically fitted within an annular space between the larger cylindrical portion 33b of the second sealing plate 33 and the outer circumferential surface of the inner ring 6'. This makes it possible to remarkably improve the tightness of the seal. Thus, this prevents ingress of rain water or dusts from the environment into the bearing over the long term. Although it is shown in FIG. 12 that the magnetic encoder 43 is integrally adhered to the second sealing plate 33, the magnetic encoder 43 can be separately arranged from the second sealing plate 33.

As described above, according to this embodiment, the wheel speed sensor 20 is arranged within the sensor holder 39 and the seal 32 is arranged at the inboard side of the wheel speed sensor 20. Thus, it is possible to prevent ingress of foreign matter, such as magnetic powder, from outside of the bearing apparatus into a space between the magnetic encoder 43 and the wheel speed sensor 20. Accordingly, it is possible to remarkably improve the reliability of detection of the wheel rotation speed, to simplify the associated parts of the sensor 20, and thus to improve the workability in assembly of the wheel bearing apparatus.

FIG. 13 is a partially enlarged view of an ninth embodiment of a wheel bearing apparatus with an incorporated wheel speed detecting apparatus. This embodiment is different from the seventh embodiment (FIG. 10) only in the structure of the inboard seal. The same reference numerals are used in this embodiment to designate the same parts having the same functions of the parts as those used in the previous embodiment.

In this embodiment, the sensor holder 39 is mounted on the inboard end of the outer member 4. The sensor holder 39 includes the annular fitting member 16' and the holding member 40. An inboard seal 11' is mounted between the cylindrical portion 16c of the annular fitting member 16' and an inner ring 44.

The inboard seal 11' includes first and second annular sealing plates 21 and 22'. Each plate 21, 22' has a substantially "L" shaped cross-sectional configuration formed by press working. The first sealing plate 21 is fit onto the cylindrical portion 16c of the annular fitting member 16'. The larger end portion of the inner ring 44 is formed with a stepped portion 44a of smaller diameter. The second sealing plate 22' is fit onto the stepped portion 44a. The first and second sealing plates 21 and 22' are arranged opposite toward each other.

According to this embodiment, since the inboard seal 11' is mounted in an annular space formed between the stepped portion 44a, formed on the inner ring 44, and the sensor holder 39, it is possible to assure the height of the seal 11' and thus to remarkably improve the sealing tightness.

FIG. 14 is a partially enlarged view of a tenth embodiment of a wheel bearing apparatus with an incorporated wheel speed detecting apparatus. This embodiment is a modification of the ninth embodiment (FIG. 13) and differs only in the structure of the detecting portion. The same reference numerals are used in this embodiment to designate the same parts having the same functions of the parts as those used in the previous embodiment.

According to this embodiment, the magnetic encoder 43 is fit onto the stepped portion 44a via a base 45. The base 45 is formed as an annular ring configuration by press forming of ferromagnetic steel such as ferritic stainless steel sheet (JIS SUS 430 etc.) or preserved cold rolled sheet (JIS SPCC etc.). The magnetic encoder 43 is adhered, via vulcanized adhesion, on the outer circumferential surface of the base 45. The magnetic encoder 43 is formed from an elastomer, such as rubber etc., with intermixed magnetic powder. The magnetic encoder 19 has N and S poles alternately arranged along its circumferential direction and forms a rotary encoder to detect the wheel rotation speed.

Also in this embodiment, the wheel speed sensor 20 is arranged within the sensor holder 39. The seal 11' is arranged at the inboard side of the wheel speed sensor 20. Thus, it is possible to prevent ingress of foreign matter, such as magnetic powder, into a space between the magnetic encoder 43 and the wheel speed sensor 20 from outside of the bearing apparatus. Accordingly, it is also possible to remarkably improve the reliability of the detection of the wheel rotation speed.

The wheel bearing apparatus with an incorporated wheel speed detecting apparatus can be applied to wheel bearing apparatus with any type of wheel speed detecting apparatus.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus with an incorporated wheel speed detecting apparatus comprising:
   an outer member having double row outer raceway surfaces formed on its inner circumferential surface;
   an inner member including a wheel hub with an integrally formed wheel mounting flange at one end and a cylindrical portion axially extending from the wheel mounting flange, an inner ring fit onto the cylindrical portion of the wheel hub, double row inner raceway surfaces, opposite to the double row outer raceway surfaces, formed on the outer circumferential surfaces of the wheel hub and inner ring, respectively;
   an inboard side end of said outer member is positioned outboard of an inboard side end of said inner ring;
   double row rolling elements arranged between the outer and inner raceway surfaces;
   an encoder mounted on the outer circumferential surface of the inner ring;
   an annular sensor holder arranged on the end of the outer member opposite to the encoder, said sensor holder including an annular fitting member and a holding member, the annular fitting member comprises a cylindrical fitting portion press-fitted on the outer circumferential surface of the outer member, a flange portion extending radially inward from the fitting portion, a conical portion extending axially inboard from the flange portion, and a cylindrical portion axially extending from the tip of the conical portion;
   a wheel rotation speed detecting sensor integrally molded with the sensor holder and arranged opposite to the encoder via a predetermined radial gap;
   the encoder has an annular ring configuration with its characteristics alternately and equidistantly varying along its circumferential direction;
   a seal is arranged at the inboard side of the wheel rotation speed detecting sensor, said seal including a first annular sealing plate fit on an inner circumferential surface of the axially extending portion of the annular fitting member of the sensor holder, the seal including a second annular sealing plate mounted on the inner ring, and said first and second annular plates oppose each other so that the seal is sandwiched between the axially extending portion of the annular fitting member of the sensor holder and the inner ring.

2. The wheel bearing apparatus of claim 1, wherein the encoder is a magnetic encoder with N and S poles alternately arranged along its circumference.

3. The wheel bearing apparatus of claim 1, wherein the sensor holder includes the annular fitting member is formed of steel sheet, the flange portion adapted to be in close contact with the end surface of the outer member, and the first sealing plate being fit into the cylindrical portion.

4. The wheel bearing apparatus of claim 1, wherein the annular fitting member is press-formed of non-magnetic steel plate having corrosion resistance.

5. The wheel bearing apparatus of claim 1, wherein a smaller diameter portion is formed on the outer circumferential surface of the inner ring, and wherein the seal is mounted within an annular space formed between the smaller diameter portion and the sensor holder.

6. The wheel bearing apparatus of claim 1, wherein the second sealing plate has a cylindrical portion and a standing portion extending radially outward from the cylindrical portion, and a sealing member is integrally adhered to the first sealing plate via vulcanized adhesion and lips of the sealing member are slidably contacting the cylindrical portion and the standing portion.

7. The wheel bearing apparatus of claim 6, wherein the second sealing plate cylindrical portion projects from a larger end face of the inner ring.

8. The wheel bearing apparatus of claim 1, wherein the second sealing plate has a cylindrical portion, a larger cylindrical portion and a standing portion extending radially outward from the larger cylindrical portion, and a sealing member integrally adhered to the first sealing plate via vulcanized adhesion and lips of the sealing member are in sliding contact with the larger cylindrical portion and the standing portion.

9. The wheel bearing apparatus of claim 8, wherein a ring shaped elastic member is elastically fit within an annular space between the larger cylindrical portion and the outer circumferential surface of the inner ring.

10. The wheel bearing apparatus of claim 1, wherein the encoder and the wheel rotation speed detecting sensor are arranged at a predetermined angle.

11. A wheel bearing apparatus with an incorporated wheel speed detecting apparatus comprising:
an outer member having double row outer raceway surfaces formed on its inner circumferential surface;
an inner member including a wheel hub with an integrally formed wheel mounting flange at one end and a cylindrical portion axially extending from the wheel mounting flange, an inner ring fit onto the cylindrical portion of the wheel hub, double row inner raceway surfaces, opposite to the double row outer raceway surfaces, formed on the outer circumferential surfaces of the wheel hub and inner ring, respectively;
an inboard side end of said outer member is positioned outboard of an inboard side end of said inner ring;
double row rolling elements arranged between the outer and inner raceway surfaces;
an encoder mounted on the outer circumferential surface of the inner ring;
an annular sensor holder arranged on the end of the outer member opposite to the encoder, said sensor holder including an annular fitting member and a holding member, said annular fitting member including an axially extending portion radially spaced from said inner ring;
a wheel rotation speed detecting sensor integrally molded with the sensor holder and arranged opposite to the encoder via a predetermined radial gap;
the encoder has an annular ring configuration with its characteristics alternately and equidistantly varying along its circumferential direction;
a seal is arranged at the inboard side of the wheel rotation speed detecting sensor, said seal including a first annular sealing plate fit on an inner circumferential surface of the axially extending portion of the annular fitting member of the sensor holder, the seal including a second annular sealing plate mounted on the inner ring, and said first and second annular plates oppose each other so that the seal is sandwiched between the axially extending portion of the annular fitting member of the sensor holder and the inner ring; and
a shield having a substantially "C" shaped cross-sectional configuration is arranged at the inboard side of the seal so that it opposes a shoulder of an outer joint member via a small radial gap to form a labyrinth seal therebetween.

12. The wheel bearing apparatus of claim 11, wherein the shield includes a first cylindrical portion fit into the sensor holder, a standing portion extending radially inward from the first cylindrical portion and a second cylindrical portion axially extending from the standing portion, and wherein the standing portion opposes the second sealing plate via a small axial gap to form a labyrinth seal therebetween.

13. The wheel bearing apparatus of claim 11, wherein the shield includes a first cylindrical portion fit into the sensor holder, a standing portion extending radially inward from the first cylindrical portion and a second cylindrical portion axially extending from the standing portion, and wherein the second cylindrical portion opposes the end face of the inner ring via a small axial gap to form a labyrinth seal therebetween.

14. A wheel bearing apparatus with an incorporated wheel speed detecting apparatus comprising:
an outer member having double row outer raceway surfaces formed on its inner circumferential surface;
an inner member including a wheel hub with an integrally formed wheel mounting flange at one end, a cylindrical portion axially extending from the wheel mounting flange, an inner ring fit onto the cylindrical portion of the wheel hub, double row inner raceway surfaces, opposite to the double row outer raceway surfaces, formed on the outer circumferential surfaces of the wheel hub and inner ring, respectively;
an inboard side end of said outer member is positioned outboard of an inboard side end of said inner ring;
double row rolling elements arranged between the outer and inner raceway surfaces;
an encoder mounted on the outer circumferential surface of the inner ring;
a sensor holder including an annular fitting member, the annular fitting member comprises a cylindrical fitting portion press-fitted on the outer circumferential surface of the outer member, a flange portion extending radially inward from the fitting portion, a conical portion extending axially inboard from the flange portion, and a cylindrical portion axially extending from the tip of the conical portion and a holding member with an embedded wheel rotation speed detecting sensor, said speed detecting sensor arranged oppositely to the encoder via a predetermined radial gap;
the encoder has an annular ring configuration with its characteristics alternately and equidistantly varying along its circumferential direction;

said sensor holder is arranged radially inward from the outer circumferential surface of a knuckle fitting surface of the outer member, and terminals for taking out output signal from the wheel rotation speed detecting sensor extend radially outward and are connected to a wire harness that is circumferentially arranged along the end surface of the outer member; and a seal is arranged at the inboard side of the wheel rotation speed detecting sensor, the seal including a first annular sealing plate press fitted on an inner circumferential surface of the axially extending portion of the annular fitting member of the sensor holder and a second annular sealing plate, mounted on the inner ring, respectively, and said first and second annular plate oppose each other so that the seal is sandwiched between the axially extending portion of the annular fitting member of the sensor holder and the inner ring.

15. The wheel bearing apparatus of claim 14, wherein the wheel rotation speed detecting sensor is formed by a plurality of magnetic detecting elements, and the wheel rotation speed detecting sensor, and the leading-out portion for connecting the terminals and wire harnesses are integrally molded by synthetic resin within the holding member.

* * * * *

UNITED STATES PATENT AND TRADEMARK OFFICE
CERTIFICATE OF CORRECTION

PATENT NO. : 8,132,967 B2
APPLICATION NO. : 11/662419
DATED : March 13, 2012
INVENTOR(S) : Kazuhisa Shigeoka et al.

It is certified that error appears in the above-identified patent and that said Letters Patent is hereby corrected as shown below:

Column 8
Line 38, "$1\ a$" should be --$1a$--

Column 11
Line 15, "$21\ a$" should be --$21a$--

Signed and Sealed this
Tenth Day of July, 2012

David J. Kappos
*Director of the United States Patent and Trademark Office*